(12) United States Patent
Amano et al.

(10) Patent No.: US 7,727,456 B2
(45) Date of Patent: Jun. 1, 2010

(54) METHOD OF MANUFACTURING COMPOSITE MOLDED ARTICLE AND MANUFACTURING APPARATUS OF COMPOSITE MOLDED ARTICLE

(75) Inventors: Katsuyuki Amano, Aichi (JP); Naoko Amano, legal representative, Handa (JP); Akihiro Suzuki, Aichi (JP); Yukiko Tsuya, Aichi (JP); Tatsuya Tamura, Aichi (JP)

(73) Assignee: Tokai Kogyo Co., Ltd., Obu (JP)

( * ) Notice: Subject to any disclaimer, the term of this patent is extended or adjusted under 35 U.S.C. 154(b) by 706 days.

(21) Appl. No.: 11/498,178

(22) Filed: Aug. 3, 2006

(65) Prior Publication Data
US 2007/0051823 A1 Mar. 8, 2007

(30) Foreign Application Priority Data
Sep. 8, 2005 (JP) .............................. 2005-260686

(51) Int. Cl.
| B29D 22/00 | (2006.01) |
| B28B 5/00 | (2006.01) |
| B29C 45/14 | (2006.01) |
| B29C 45/22 | (2006.01) |
| B29C 45/18 | (2006.01) |

(52) U.S. Cl. ........................ 264/572; 264/250; 264/279; 264/328.8; 264/328.12

(58) Field of Classification Search .................. 264/279, 264/328.1, 328.8, 252, 572, 271.1, 328.12, 264/250
See application file for complete search history.

(56) References Cited

U.S. PATENT DOCUMENTS 5,972,268 A 10/1999 Nakajima et al.
2005/0189780 A1* 9/2005 Hara et al. .................... 296/93

FOREIGN PATENT DOCUMENTS

| JP | A 07-016843 | 1/1995 |
| JP | A 09-057788 | 3/1997 |
| JP | A 2002-59493 | 2/2002 |
| JP | A-2003-165137 | 6/2003 |
| JP | 2005206026 A * | 8/2005 |
| JP | 2005343178 A * | 12/2005 |
| WO | WO 02/14096 A2 | 2/2002 |

* cited by examiner

*Primary Examiner*—Joseph S Del Sole
*Assistant Examiner*—Ninh V Le
(74) *Attorney, Agent, or Firm*—Oliff & Berridge, PLC

(57) ABSTRACT

A method of manufacturing a composite molded member, which includes the steps of: setting the main body inside an injection mold; closing the injection mold to fix the main body inside the injection mold; and forming the cushion members on the edges of the main body through heat and pressure of the injected elastic polymer material. The elastic polymer material is injected from an injection gate into one of the first and second edges at the back surface side of the main body of the molding cavities to flow the elastic polymer material into one of the molding cavities. The elastic polymer material flows into the other of the molding cavities through the connecting flow path, and fills the molding cavities with the elastic polymer material.

16 Claims, 16 Drawing Sheets

METHOD OF MANUFACTURING COMPOSITE MOLDED ARTICLE AND MANUFACTURING APPARATUS OF COMPOSITE MOLDED ARTICLE

BACKGROUND OF THE INVENTION

1. Field of the Invention

The present invention relates to a method of manufacturing a composite molded article, wherein the article includes a main body member molded of a material with high hardness and cushion members molded of elastic polymer materials of which the hardness is relatively lower than the main body member, and an apparatus of manufacturing the composite molded article.

2. Description of the Related Art

As an example of a composite molded article, a pillar garnish for vehicle can be exemplified.

In this type of pillar garnish, a main body member molded of a material with stiffness such as a hard resin material and a cushion member formed of the elastic polymer materials which is softer than the main body member are integrally bonded in the edge portion where the main body member comes in contact with an automotive panel or windowpane when the pillar garnish is mounted and used in an automotive body. Then, the main body member formed of a hard material is prevented from coming in contact with the automotive panel or windowpane by the cushion member, which in turn prevents the automotive panel or windowpane from being damaged. Further, abnormal noise due to vibration during moving of a vehicle is prevented from occurring by the cushion member.

As a method of manufacturing a composite molded article such as a pillar garnish for vehicle and an apparatus of manufacturing the composite molded article, the technology disclosed in JP-A-2003-165137 is known, for example.

In the above-noted document, a hollow portion having an inner shape with a predetermined size is first formed along the longitudinal direction of the main body member molded of a material with stiffness such as a hard resin material.

The main body member is set inside an injection mold in a state where the injection mold for molding the cushion member is opened. Then, the injection mold is closed, so that a molding cavity corresponding to the cushion member is formed between the main body member and the injection mold.

Further, the elastic polymer material melted by heating is injected from an injection gate to the molding cavity so as to be filled therein. Then, the cushion member is molded and integrally bonded in a predetermined position of the main body member.

SUMMARY OF THE INVENTION

In the invention disclosed in JP-A-2003-165137, however, some of the elastic polymer materials leaks from the molding cavity in the boundary between the main body member and the cushion member so that flashes can occur on the surface of the main body member, when the elastic polymer materials melted by heating are injected from the injection gate into the molding cavity so as to be filled therein and the cushion member is molded.

In the invention disclosed in the above Patent Document, a portion of the molding cavity (root portion cavity) extends in the direction orthogonal to the back surface of the main body member and intersecting the region of the internal shape of the hollow portion.

Therefore, the injection pressure of the elastic polymer materials injected into a portion of the molding cavity from the injection gate acts in the direction where a wall portion (hereinafter, referred to as "a hollow wall portion") surrounding the hollow wall portion is crushed. Such an action can cause the hollow wall portion to be deformed or crushed.

An object of the present invention is to provide a method of manufacturing a composite molded article, and a device of manufacturing the composite molded article in which, when the elastic polymer materials melted by heating are injected and filled in a molding cavity so as to mold a cushion member, the elastic polymer materials are suppressed from protruding in the boundary between a main body member and the cushion member to thereby prevent flashes from occurring. In addition, a hollow wall portion surrounding the hollow portion of the main body member can be prevented from being deformed or crushed by the injection pressure of the elastic polymer materials.

According to a first aspect of the invention, A method of manufacturing a composite molded member which is mountable onto a mounting body is provided that integrally includes: a front surface; a back surface; a projecting portion that projects from a back surface side; a first edge that faces a first portion of the mounting body when the composite molded member is mounted; a second edge that faces a second portion having a position which is different from that of the first portion; a long main body that is molded to have a hollow portion that is formed between the first and second edges and extending in a longitudinal direction, the hollow portion having an inner cross-sectional shape smaller than a distance between the first and second edges of the main body; and cushion members that are formed of an elastic polymer material, a hardness of which is lower than that of the main body, and are directly injection-molded on the first and second edges of the main body, the cushion members extending along the first and second edges in the longitudinal direction, the method of manufacturing the composite molded member comprising the steps of: setting the main body inside an injection mold, which is openable and closable to mold the cushion member, when the injection mold is opened; closing the injection mold so as to fix the main body inside the injection mold and to form molding cavities, which extend along the longitudinal direction between the main body and the injection mold for forming the cushion members, and a connecting flow path, which connects the molding cavities and is defined between the injection mold and the back surface of the main body; and integrally forming the cushion members on the first and second edges of the main body through at least one of heat and pressure of the injected elastic polymer material, by injecting the elastic polymer material melted by heating from an injection gate into a range of at least one of the first and second edges at the back surface side of the main body of the molding cavities and into a position which does not reach the hollow portion so as to flow the elastic polymer material into one of the molding cavities, flowing the elastic polymer material into the other of the molding cavities through the connecting flow path, and filling the molding cavities with the elastic polymer material. In the first aspect, the injection pressure of the elastic polymer materials presses the edges of the main body member against the mold surface of the injection mold from the back surface. Therefore, the edges of the main body member are closely-touched to the mold surface so that a gap does not form therebetween. Further, the injection mold does not act directly in the direction where the hollow wall portion is crushed.

Therefore, according to the first aspect of the invention, the elastic polymer materials are suppressed from protruding in the boundary between the main body and the cushion member to thereby prevent flashes from occurring. In addition, the hollow wall portion of the main body member can be prevented from being deformed or crushed. Further, the main body member has the hollow portion formed therein. Accordingly, although a slight variation is present in the outer shape of the main body member when the main body member is set inside the injection mold of the cushion member and the injection mold is closed, the variation can be absorbed by the elastic deformation of the hollow wall portion.

According to a second aspect of the invention, the main body is gas-assisted injection-molded of a hard synthetic resin material to have the hollow portion extending in the longitudinal direction of the main body.

In the second aspect, since the main body member is molded of a hard synthetic resin material by the gas-assist injection-molding, the outer shape and dimension of the main body member can be accurately molded (warpage or twists can be prevented from occurring when molding the main body). Therefore, when the cushion member is molded, an unexpected gap between the main body member and the mold surface of the injection mold can be more reliably prevented from occurring.

Therefore, when the cushion member is molded, according to the second aspect of the invention, a predetermined shape of cavity can be formed by the main body member and the mold surface of the injection mold, which makes it possible to prevent the cushion member from being defectively molded, in addition to the effect of the first aspect.

According to a third aspect of the invention, the hollow portion of the main body is formed by a hollow wall portion surrounding the hollow portion, and the projecting portion projecting from the back surface side of the main body integrally projects from at least one of a backside wall and a side wall of the hollow wall portion.

In the third aspect, the projecting portion projecting from the back surface integrally projects from the backside wall and/or side wall of the hollow wall portion surrounding the hollow portion of the main body member. Therefore, a surface sink (also referred to as "a sink mark") caused by the molding of resin can be prevented from occurring on the surface side of the main body member, that is, the surface of the surface wall of the hollow wall portion. Further, the rigidity of the main body member can be enhanced through a reinforcing effect, and warpage or twist can be effectively prevented.

Therefore, according to the third aspect of the invention, the surface sink can be prevented from occurring on the surface of the main body, in addition to the effect of the first or second aspect.

According to a fourth aspect of the invention, the connecting flow path includes an inclined guide surface which is inclined with respect to an injection direction of the elastic polymer material and intersects a wall of a hollow portion side so as to cause the injected elastic polymer material to flow along the inclined guide surface.

In the fourth aspect, when flowing in the connecting flow path, the elastic polymer material flows along the inclined guide surface of the wall of the hollow portion. Therefore, the pressure of the flowing elastic polymer material at the time of injection can be prevented from acting in the direction crossed to the wall.

Therefore, according to the fourth aspect of the invention, the hollow wall portion of the main body member can be favorably prevented from being deformed or damaged, in addition to the effect of any one of the first to third aspects.

According to a fifth aspect of the invention, in a portion where the connecting flow path connecting the molding cavities across a back surface side of the hollow wall portion is formed, the back surface of the main body is formed into a substantial arch shape having a convex back surface.

In the fifth aspect, the pressure when the elastic polymer material flows or the pressure is kept constant (the dwelling) is converted into an internal compression force along the substantial arch shape by the back surface of the main body member, which is formed in a substantial arch shape such that the back surface thereof becomes convex. Accordingly, when the elastic polymer material flows in the connecting flow path or when the pressure thereof is kept constant, the hollow wall portion of the main body member can be prevented from being deformed or crushed by the pressure of the elastic polymer material.

Therefore, according to the fifth aspect of the invention, the hollow wall portion of the main body member can be effectively prevented from being deformed or crushed, in addition to the effect of any one of the first to fourth aspects.

According to a sixth aspect of the invention, before closing the injection mold, a separate reinforcement is disposed in a portion corresponding to the connecting flow path on the back surface of the main body.

In the construction, the strength of the back surface of the main body member is increased by the reinforcement.

Therefore, according to the sixth aspect of the invention, the strength of the back surface of the main body member is increased by the reinforcement, so that the hollow wall portion of the main body member can be favorably prevented from being deformed or damaged.

According to a seventh aspect of the invention, the reinforcement is formed of a rigid material which has higher thermal resistance than a material of the main body.

In the seventh aspect, the reinforcement formed of a rigid material with high thermal resistance is disposed, so that the strength and thermal resistance of the back surface of the main body member is favorably maintained even though the main body member comes in contact with the elastic polymer material melted by heating.

Therefore, according to the seventh aspect of the invention, the hollow wall portion of the main body member can be effectively prevented from being deformed or crushed, in addition to the effect of the sixth aspect.

According to an eighth aspect of the invention, the rigid material forming the reinforcement is a metal plate.

In the eighth aspect, the reinforcement is formed of a metallic plate which is easily processed and is excellent in thermal resistance and has a low material cost, so that the hollow portion of the main body member can be favorably prevented from being deformed or crushed.

Therefore, according to the eighth aspect of the invention, the hollow wall portion of the main body member can be effectively prevented from being deformed or crushed, and there is an advantage in cost, in addition to the effect of the seventh aspect.

According to a ninth aspect of the invention, the connecting flow path has an entrance side and a downstream side of the elastic polymer material, and a flow-path cross section of the downstream side is larger than that of the entrance side.

In the ninth aspect, when the elastic polymer material flows in the connecting flow path, the injection pressure of the elastic polymer materials acting on the hollow wall portion is reduced as the flow-path cross section gradually increases from the entrance side toward the downstream side. Accordingly, the hollow portion is prevented from being deformed and damaged.

Therefore, according to the ninth aspect of the invention, the hollow wall portion of the main body member can be effectively prevented from being deformed or crushed, in addition to the effect of any one of the first to eighth aspects.

According to a tenth aspect of the invention, when the cushion members are formed, the elastic polymer material of the cushion member fill at least a portion of a recess groove located at least one of the first and second edges.

In the tenth aspect, the recess groove having a substantially V-shaped or U-shaped transverse cross-section is set to the bonding and fixing portion of the cushion member, and the main body member and the elastic polymer material of the cushion members are bonded and fixed to each other. Accordingly, it is possible to enlarge the contact area of the cushion members with respect to the edge of the main body member.

Therefore, according to the tenth aspect of the invention, the bonding and fixing force of the cushion member can be enhanced by enlarging the contact area of the cushion members with respect to the edge of the main body member, so that the cushion members can be prevented from being removed, in addition to the effects of any one of the first through ninth aspects.

According to an eleventh aspect of the invention, the projecting portion projecting from the back surface side of the main body is formed as a reinforcing rib which extends in the longitudinal direction in a portion other than a portion where a clip mounting portion is formed.

In the eleventh aspect, the torsional rigidity or front/back-direction bending strength of the main body member can be enhanced by the reinforcing rib.

Therefore, according to the eleventh aspect of the invention, the torsional rigidity or front/back-direction bending strength of the main body member can be enhanced, and thus the composite molded article can be stably mounted on an automotive body in a predetermined posture, in addition to the effect of any one of the first to tenth aspects.

According to a twelfth aspect of the invention, in a portion of the reinforcing rib in the longitudinal direction, at leas one of a removed portion where the reinforcing rib is removed and an avoiding rib that deviates from the longitudinal direction is formed, an injection route is provided in one of the removed portion and the avoiding rib, and the elastic polymer material of the cushion members is injected through the injection route.

In the twelfth aspect, when the injection route is provided in the removed portion of the reinforcing rib provided in a portion of the reinforcing rib in a longitudinal direction, a through hole for connecting the injection route and the connecting flow path is not needed, and it is possible to simplify the structure of the mold for molding the main body member.

Further, when the injection route is provided in the avoiding rib provided in a portion of the reinforcing rib in the longitudinal direction, the reinforcing rib continues in the longitudinal direction, and the strength of the main body member is further enhanced.

Therefore, according to the twelfth aspect of the invention, it is possible to simplify the structure of the mold for molding the main body member and to further enhance the strength of the main body member, in addition to the effect of the eleventh aspect.

According to a thirteenth aspect of the invention, a side surface of the avoiding rib is used as one side wall of the injection route.

In the thirteenth aspect, the mold structure of the injection mold can be simplified by using the side surface of the avoiding rib as one side wall of the injection route.

Therefore, according to the thirteenth aspect of the invention, it is possible to simplify the mold structure of the injection mold and to reduce a manufacturing cost of the injection mold, in addition to the effect of the twelfth aspect.

According to a fourteenth aspect of the invention, the injection gate comprises a plurality of injection gates provided to be spaced apart from each other in the longitudinal direction, and the injection route and the connecting flow path are provided in a place corresponding to each injection gate.

In the fourteenth aspect, the elastic polymer materials can be injected by the injection gates, the injection routes, and the connecting flow paths, which are provided in a plurality of places in the longitudinal direction. Accordingly, the loss in injection pressure can be suppressed, so that the necessary and sufficient elastic polymer material can be injected and filled in the molding cavities.

Therefore, according to the fourteenth aspect of the invention, the necessary and sufficient elastic polymer materials can be injected and filled in the molding cavities so that the cushion members can be favorably molded without being defectively molded (unfilled or short shot), in addition to the effect of any one of the first to thirteenth aspects.

According to the fifteenth aspect of the invention, A manufacturing apparatus of a composite molded member which is mountable onto a mounting body is provided, which includes: a front surface; a back surface;

a projecting portion that projects from a back surface side; a first edge that faces a first portion of the mounting body when the composite molded member is mounted; a second edge that faces a second portion having a position which is different from that of the first portion; a long main body that is molded to have a hollow portion that is formed between the first and second edges and extending in a longitudinal direction, the hollow portion having an inner cross-sectional shape smaller than a distance between the first and second edges of the main body; and cushion members that are formed of an elastic polymer material, a hardness of which is lower than that of the main body, and are directly injection-molded on the first and second edges of the main body, the cushion members extending along the first and second edges in the longitudinal direction, the manufacturing apparatus comprising: an injection mold having a fixed mold and a movable mold that is openable and closable, wherein, when the injection mold is opened, the main body is set in one of the fixed and movable molds, when the injection mold is closed, molding cavities, which extend along the first and second edges in the longitudinal direction for forming the cushion members, are defined between the first and second edges of the set main body and the injection mold, and a connecting flow path, which connects the respective molding cavities, is defined between the back surface of the main body and the injection mold, and in a predetermined position of the injection mold, an injection gate for injecting the elastic polymer material into the molding cavity is formed between the first and second edges at the back surface of the main body and in a position which does not reach the hollow portion.

In the fifteenth aspect, a plurality of injection gates are provided within an area of the two edges of the back surfaces of the main body member and in the position which does not reach the inner edge of the hollow portion, and the injection pressure of the elastic polymer material injected into the injection route from the injection gate presses the edge of the main body member against the mold surface of the injection mold from the back surface. Accordingly, the edge of the main body member is closely-attached to the mold surface, so that an unexpected gap does not form therebetween. Therefore, it is possible to prevent flashes from occurring.

When the composite molded article is manufactured by using the aforementioned device of manufacturing the composite molded article, the injection pressure of the elastic polymer material does not act directly in the direction where the hollow wall portion of the main body member will be crushed. Therefore, it is possible to prevent the hollow wall portion of the main body member from being deformed or crushed.

Therefore, according to the fifteenth aspect of the invention, the elastic polymer material is suppressed from protruding in the boundary between the main body member and the cushion member so that flashes are prevented from occurring, and the hollow wall portion of the main body member can be prevented from being deformed or crushed by the injection pressure of the elastic polymer material, which makes it possible to manufacture a favorable composite molded article.

According to a sixteenth aspect of the invention, the injection gates comprises a plurality of injection gates provided to be spaced apart from each other in the longitudinal direction of the main body.

In the sixteenth aspect, the elastic polymer material can be injected by the injection gates provided in a plurality of places in the longitudinal direction. Accordingly, the loss in injection pressure is suppressed, so that the necessary and sufficient elastic polymer materials can be injected and filled in the molding cavity.

Therefore, according to the sixteenth aspect of the invention, the necessary and sufficient elastic polymer materials can be injected and filled in the molding cavity so that the cushion member can be favorably molded without being defectively molded, in addition to the effect of the fifteenth aspect.

According to a seventeenth aspect of the invention, one of the fixed and movable molds, in which the main body is set, has a holding unit that is detachably engaged with the projecting portion of the main body so as to hold the main body, when the main body is set.

In the seventeenth aspect, the projecting portion of the main body member is engaged with the holding unit of one mold so that the main body member is set in the mold. Accordingly, even when a transverse injection molding machine which is opened and closed in the transverse direction is used, the main body member can be prevented from being positionally deviated or dropped at the time of opening and closing the injection mold.

Therefore, according to the seventeenth aspect of the invention, the main body member can be prevented from being positionally deviated or dropped at the time of opening and closing the injection mold, in addition to the effect of the fifteenth or sixteenth aspect. Accordingly, it is possible to efficiently manufacture the composite molded article.

According to an eighteenth aspect of the invention, the holding unit comprises a plurality of holding units provided to be spaced apart from each other in the longitudinal direction of the main body.

In the eighteenth aspect, the main body member can be more reliably held by each of the holding units provided in the longitudinal direction of the main body member when the plurality of holding units are spaced in a predetermined distance apart from each other.

Therefore, according to the eighteenth aspect of the invention, the main body member can be more reliably prevented from being positionally deviated or dropped at the time of opening and closing the injection mold, in addition to the effect of the seventeenth aspect. Accordingly, it is possible to increase the manufacturing efficiency of the composite molded article.

According to a nineteenth aspect of the invention, the holding unit comprises a ball plunger having a ball that is engaged and released with and from an engaging portion formed on the projecting portion of the main body, the ball plunger being provided in one of the fixed and movable molds in which the main body is set.

In the nineteenth aspect, the holding units are composed of a ball plunger. Accordingly, the ball of the ball plunger can be easily and reliably engaged with the engaging portion by pushing the projecting portion of the main body member at the time of setting. The engagement can be released by pulling out the projection portion reversely.

Therefore, according to the nineteenth aspect of the invention, it is possible to further increase the manufacturing efficiency of the composite molded article, in addition to the effect of the seventeenth or eighteenth aspect.

According to a twentieth aspect of the invention, the connecting flow path is formed into a substantial arch shape between the molding cavities.

In the twentieth aspect, when the elastic polymer materials flow in the connecting flow path formed in a substantial arch shape, the pressure of the elastic polymer material does not increase partially in the connecting flow path. Further, since the back surface of the main body member has a strong structure which can prevent compressive deformation due to the pressure of the elastic polymer material, it is possible to manufacture the composite molded article while favorably preventing the hollow portion of the main body member from being deformed or crushed.

Therefore, according to the twentieth aspect of the invention, it is possible to manufacture the composite molded article while favorably preventing the hollow portion of the main body member from being deformed or crushed, in addition to the effect of any one of the fifteenth to nineteenth aspects.

According to a twenty first aspect of the invention, a portion of the injection mold which forms the connecting flow path together with the back surface of the main body is formed into a recess groove shape, and a cross section of an upstream side of the portion formed into the recess groove shape is larger than that of a downstream side.

In the twenty-first aspect, the flow-path cross-sectional area can be increasingly enlarged from the entrance of the connecting flow path toward the downstream side. As the flow-path cross-sectional area is increasingly enlarged, the flow pressure acting on the hollow wall portion by the elastic polymer material is reduced so as to prevent the hollow wall portion from being deformed or damaged.

Therefore, according to the twenty-first aspect of the invention, it is possible to manufacture the composite molded article while preventing the hollow wall portion of the main body from being deformed or crushed, in addition to the effect of any one of the fifteenth to the twentieth aspects.

According to a twenty second aspect of the invention, the injection mold further comprises a slidable mold which moved back and forth in a direction crossing an opening and closing direction of the movable mold, and the slidable mold moves back and forth synchronously with opening and closing operation of the movable mold through an inclined pin provided in the movable mold.

In the twenty-second aspect, since the sliding mold moves back and forth synchronously with the opening and closing operation of the cavity mold through the inclined pin provided in the cavity mold, a driving device (using a motor or cylinder as a driving source) exclusive use to the sliding mold is not needed, and the structure of the injection mold can be simplified as much.

Therefore, according to the twenty second aspect of the invention, it is possible to simplify and decrease in cost the structure of the injection mold, in addition to the effect of any one of the fifteenth to twenty first aspects.

DETAILED DESCRIPTION OF THE PREFERRED EMBODIMENTS

Hereinafter, preferred embodiments according to the present invention will be described with reference to the drawings.

First Embodiment

Figure 1:
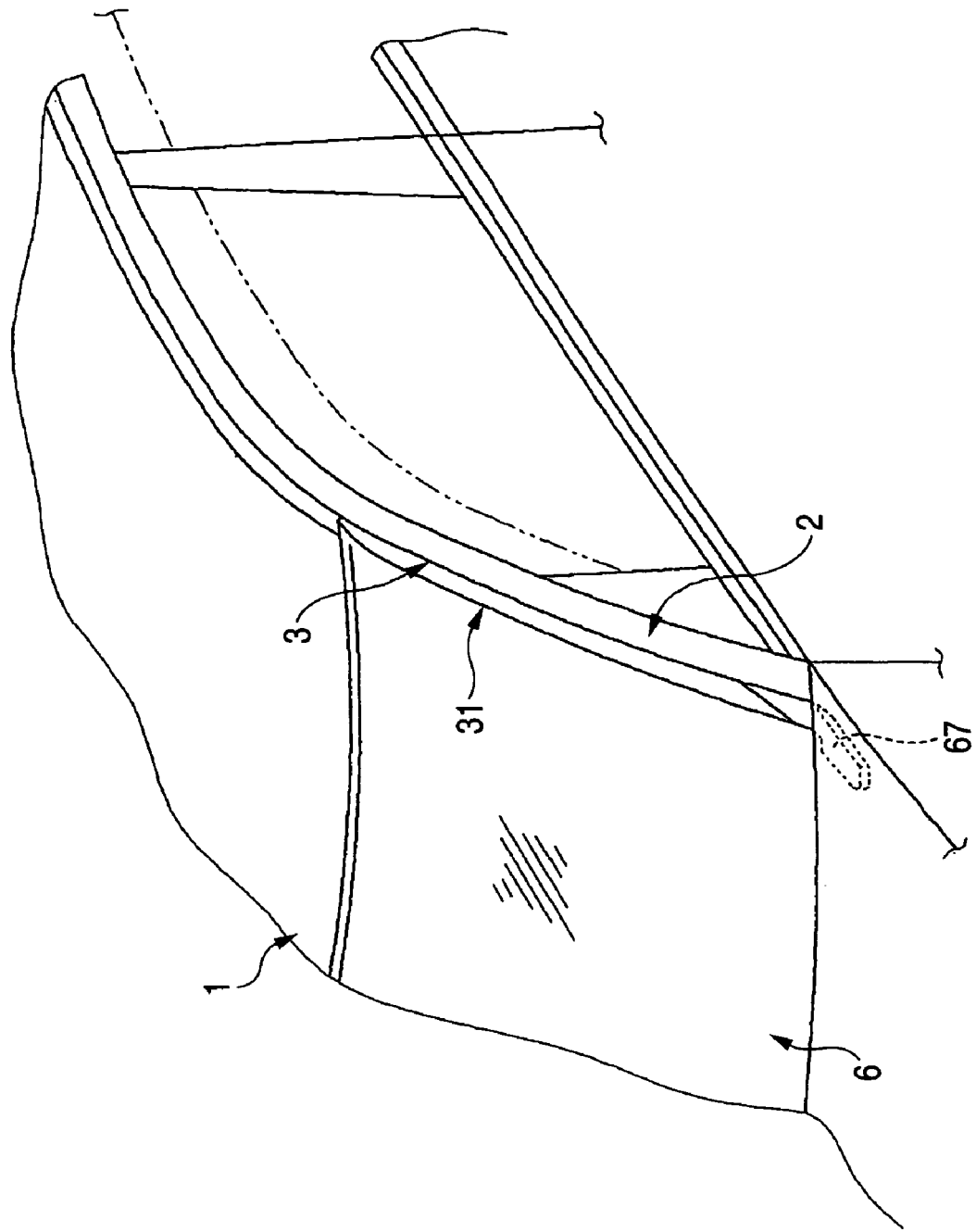
FIG. 1 is a perspective view explaining the mounted position of a pillar garnish as a composite molder vehicle for a vehicle according to a first embodiment of the present invention.

FIG. 1 is a diagram showing the mounted position of a pillar garnish as a composite molder article for a vehicle as a composite molded article according to a first embodiment of the invention.

Figure 2:
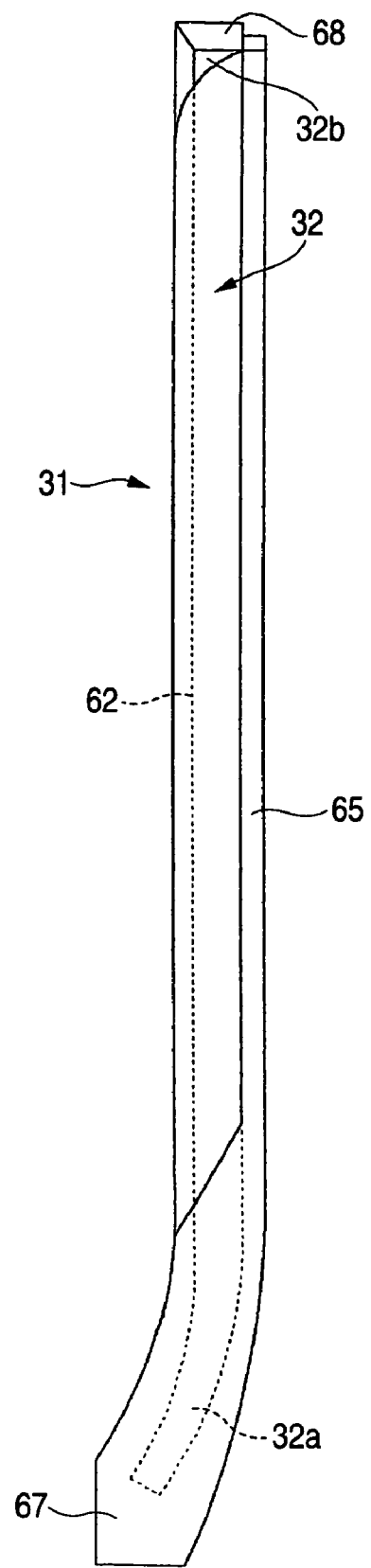
FIG. 2 is a front view illustrating the pillar garnish.
Figure 3:
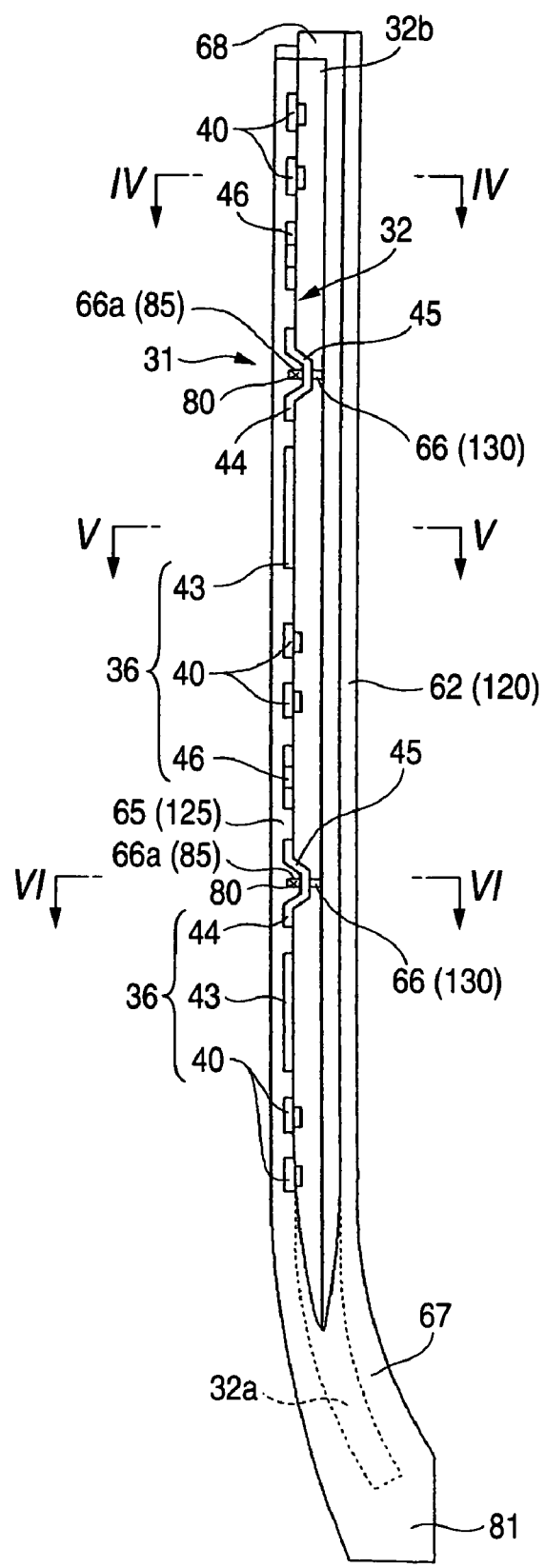
FIG. 3 is a backside view illustrating the pillar garnish.
Figure 4:
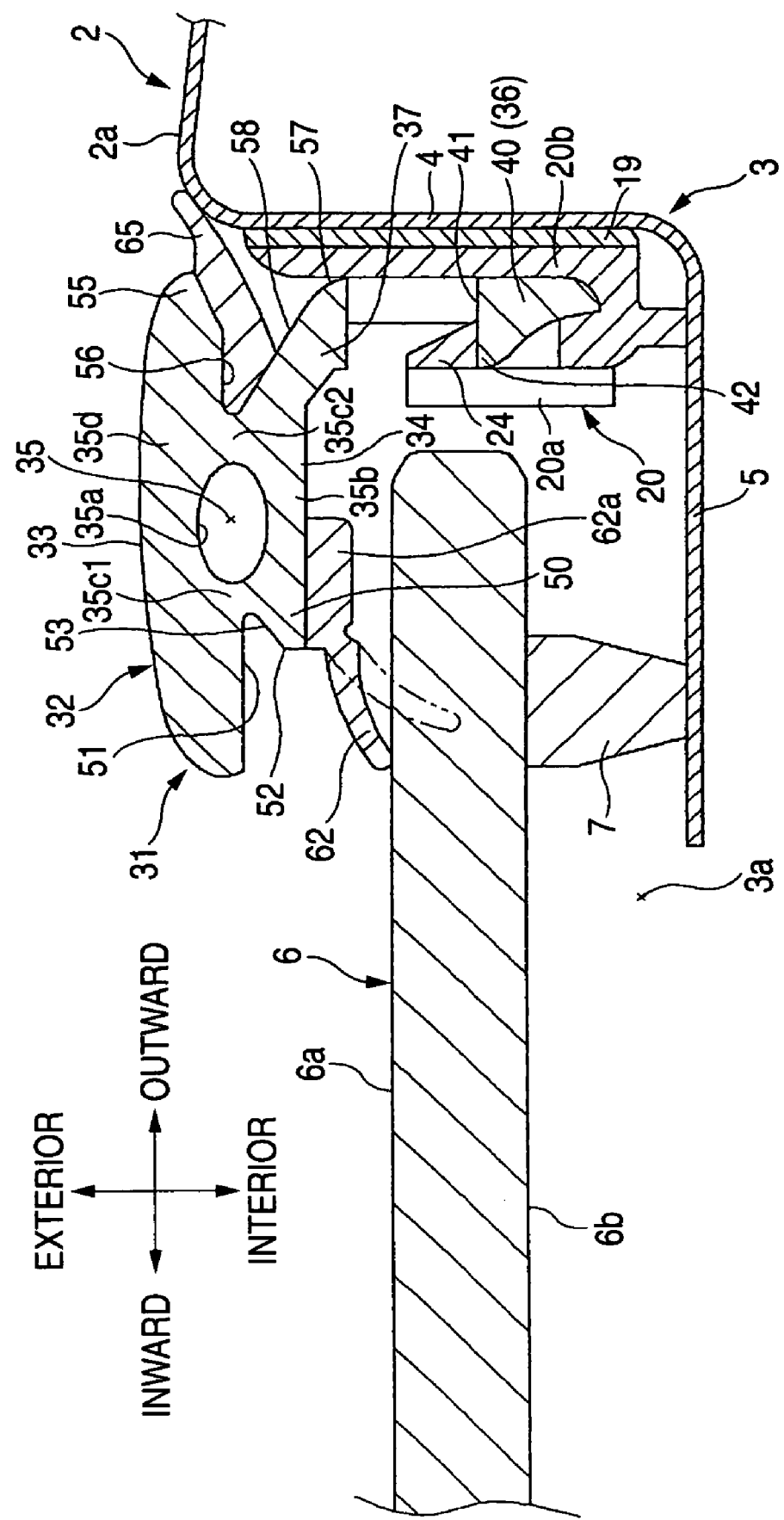
FIG. 4 is a transverse cross-sectional view taken along the IV-IV line of FIG. 3, showing a state where the pillar garnish is mounted.
Figure 5:
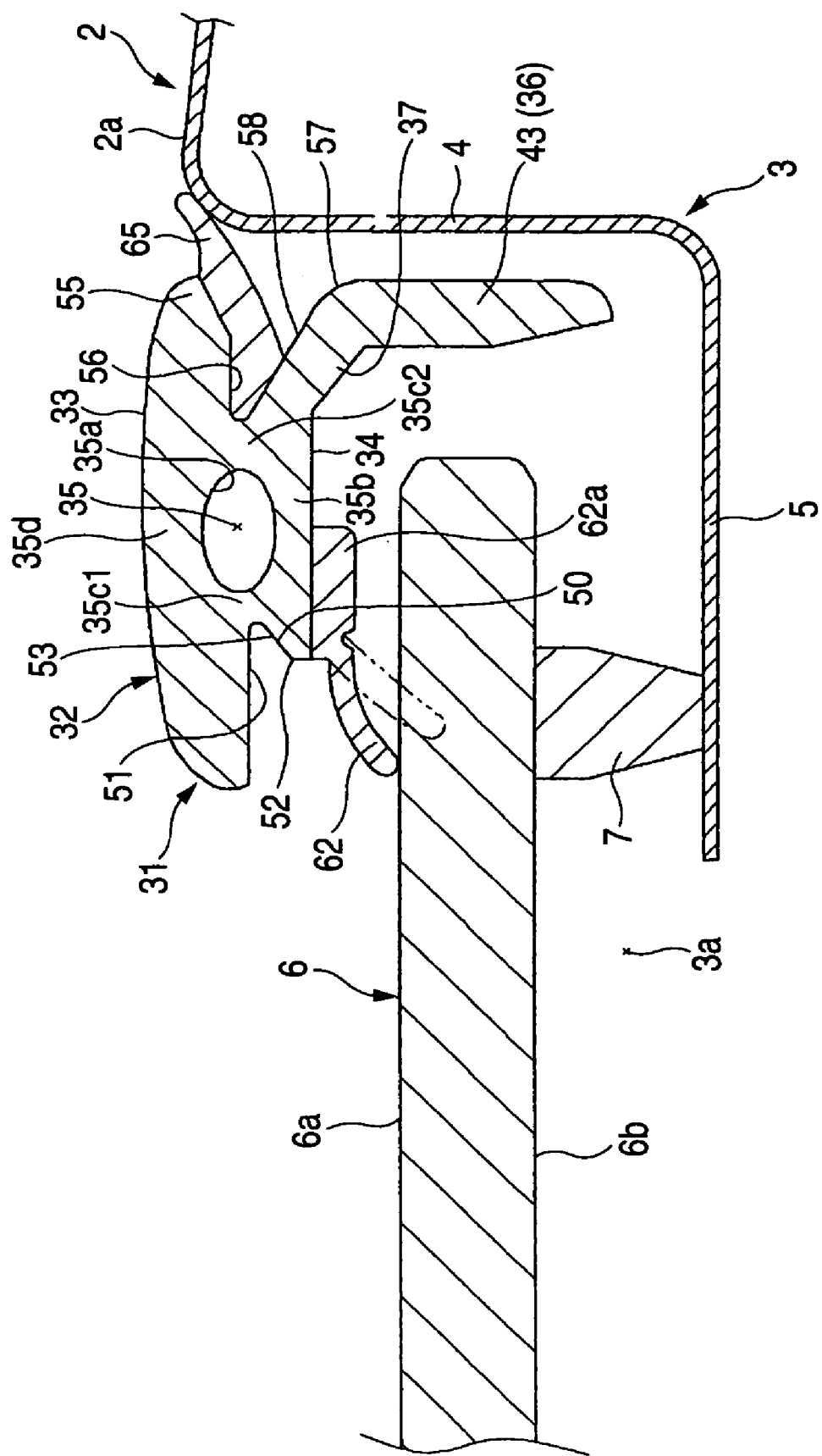
FIG. 5 is a transverse cross-sectional view taken along the V-V line of FIG. 3.
Figure 6:
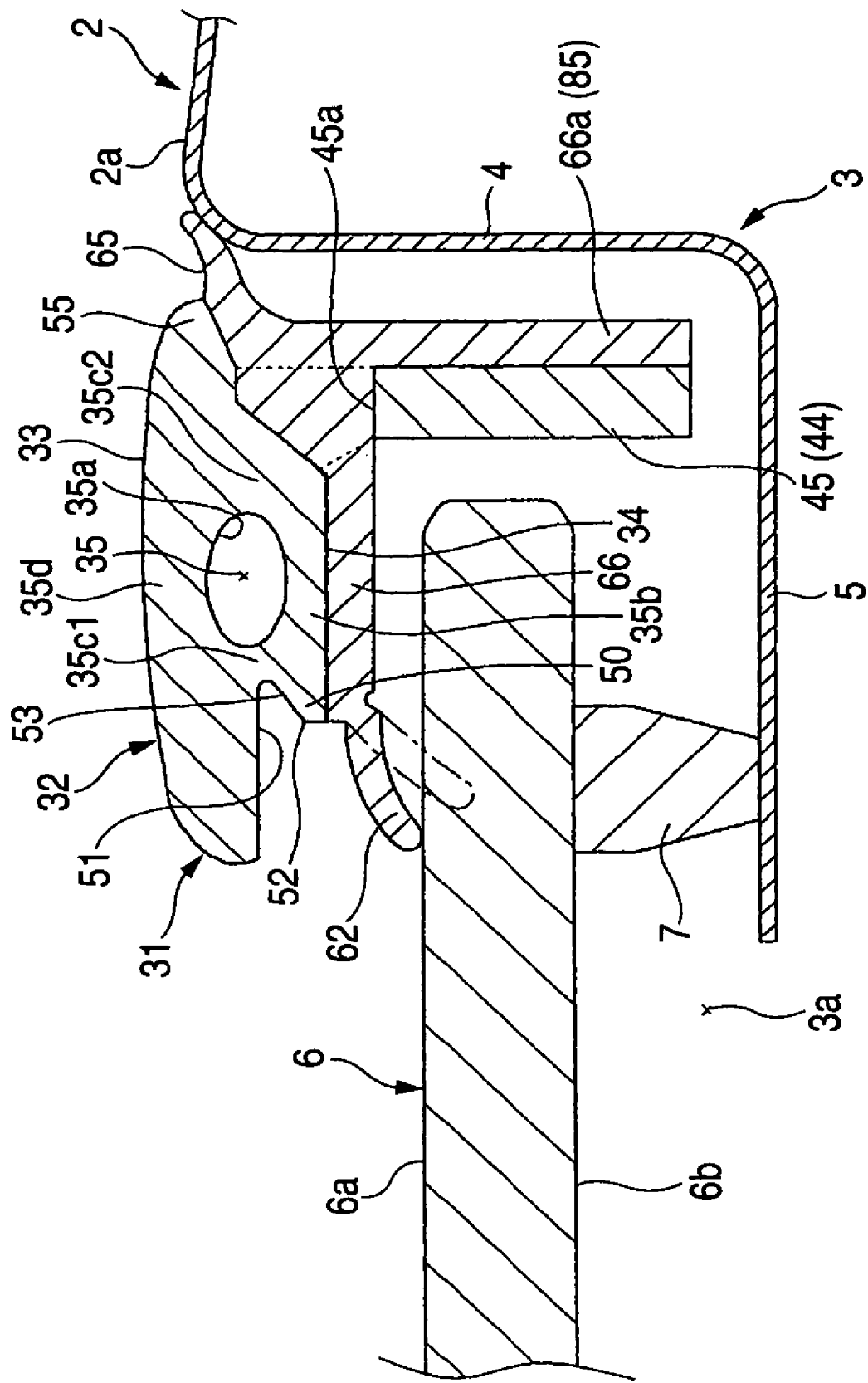
FIG. 6 is a transverse cross-sectional view taken along the VI-VI line of FIG. 3.
Figure 7:
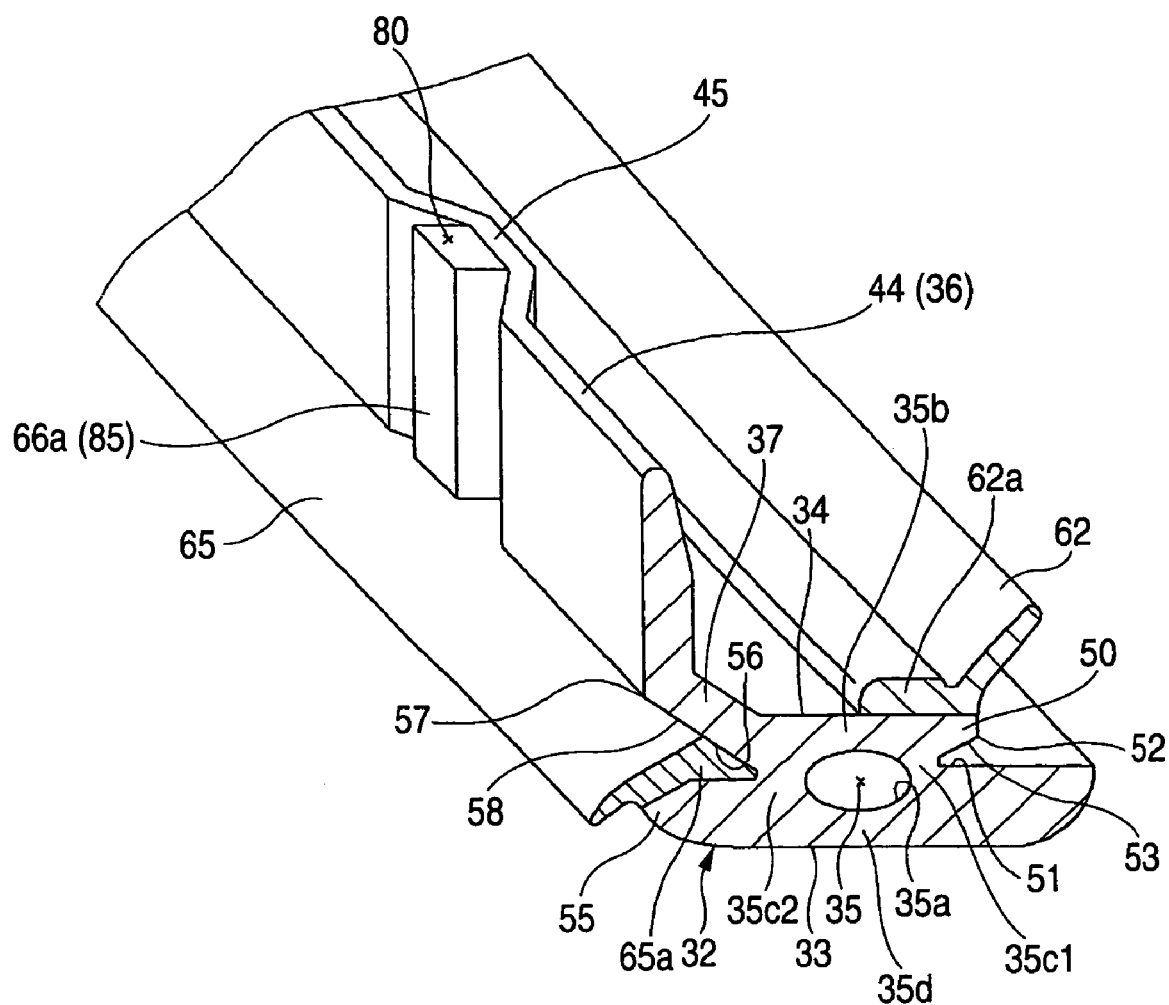
FIG. 7 is a perspective view showing a reinforcing rib and avoiding rib of the back surface of the pillar garnish.

FIG. 2 is a front view illustrating the pillar garnish. FIG. 3 is a backside view illustrating the pillar garnish. FIG. 4 is a transverse cross-sectional view taken along the IV-IV line of FIG. 3, showing a state where the pillar garnish is mounted. FIG. 5 is a transverse cross-sectional view taken along the V-V line of FIG. 3. FIG. 6 is a transverse cross-sectional view taken along the VI-VI line of FIG. 3. FIG. 7 is a perspective view illustrating a reinforcing rib and avoiding rib of the back surface of the pillar garnish.

As shown in FIGS. 1 and 4, a window opening edge 3 is formed over a roof panel 1, which is a portion of an automotive body panel, and a front pillar 2. The window opening edge 3 is provided with an outer panel 2a, a side flange 4 which follows the circumferential edge of the window opening edge 3, and a bottom flange 5 which is bent substantially at a right angle inward from the side flange 4 so as to overhang.

The opening 3a of the window opening edge 3 is covered by a front windowpane 6 formed of a transparent glass pane or resin pane. Along the circumferential edge of the back surface 6b of the front windowpane 6, dam rubber 7 formed of an elastic body is bonded. The front windowpane 6 is fitted into the window opening edge 3, and is fixed to the window opening edge 3 by an adhesive sealant (not shown) in a state where the dam rubber 7 is pressed against the outer surface of the bottom flange 5 so as to be properly and elastically deformed.

As shown in FIGS. 1 to 4, a pillar garnish 31 as a composite molded article integrally includes a long (in the up and down direction) garnish main body 32 as a main body member, an inward cushion member 62, and an outward cushion member 65. The inward and outward cushion members 62 and 65 serve as an elongated cushion member and extend in the longitudinal direction.

As shown in FIGS. 3 and 4, the garnish main body 32 as a main body member, which is mountable on the window opening edge 3 and/or the front windowpane 6 as a mounting body, includes both front and back surfaces 33 and 34; a projecting portion 36 which projects from the back surface 34 side; a first edge 50 which faces the outside surface 6a of the front windowpane 6 when the garnish main body is mounted; a second edge 55 which faces the side flange 4 of the window opening edge 3 or the outside surface of the front pillar 2; and a hollow portion 35 which is formed inside the garnish main body 32 along the longitudinal direction between the first and second edges 50 and 55, the hollow portion 35 having an internal shape of which the size is smaller than the distance between both edges 50 and 55. The garnish main body 32 is formed of a material having higher hardness than the cushion members which will be described below.

The inward and outward cushion members 62 and 65 as a cushion member which is formed of elastic polymer material of which the hardness is relatively lower than the garnish main body 32 are directly injection-molded to the first and second edges 50 and 55 so as to be integrally bonded to the garnish main body 32.

In the first embodiment, the inward and outward cushion members 62 and 65 are molded integrally with the garnish main body 32 by injection molding. The inward and outward cushion members are formed of a soft synthetic resin material (for example, olefin-based or styrene-based thermoplastic elastomer) which is more flexible and elastic than the garnish main body 32.

As a soft synthetic resin material for forming the inward and outward cushion members 62 and 65, such a material as soft PVC and rubber, which is flexible and has elasticity, is preferable, in addition to olefin-based or styrene-based thermoplastic elastomer. Further, a material which is soluble with the garnish main body 32 is more preferable.

In the downward distal end portion 32a of the garnish main body 32 in the longitudinal direction, a distal end cover portion 67 is formed by injection molding at the same time when the inward and outward cushion members 62 and 65 are formed, as shown in FIGS. 2 and 3. The distal end cover portion 67, formed of the same soft synthetic resin material as the inward and outward cushion members 62 and 65, covers the downward distal end portion 32a of the garnish main body 32 and integrally connects the downward distal end portions of the inward and outward cushion members 62 and 65.

In the upward distal end portion 32b of the garnish main body 32, a distal end cushion portion 68 is formed by injection molding at the same time when the inward and outward cushion members 62 and 65 are formed. The distal end cushion portion 68, formed of the same soft synthetic resin material as the inward and outward cushion members 62 and 65, integrally connects the upward distal end portions of the inward and outward cushion members 62 and 65.

The garnish main body 32 is formed in a shape where an edge slope composing a recess groove of which the transverse cross-section is substantially V-shaped and/or a longitudinal projection of which the transverse cross-section is substantially triangular continues along the longitudinal direction in at least one edge of the first and second edges 50 and 55 or the vicinity of the edge.

In the first embodiment, an edge slope 53 composing a recess groove 51 of which the transverse cross-section is substantially V-shaped and a longitudinal projection 52 of which the transverse cross-section is substantially triangular is formed in the first edge 50 of the garnish main body 32 so as to continue along the longitudinal direction, as shown in FIG. 7. Further, an edge slope 58 composing a recess groove 56 of which the transverse cross-section is substantially V-shaped and a longitudinal projection 57 of which the transverse cross-section is substantially triangular is formed in the second edge 55 of the garnish main body 32 so as to continue along the longitudinal direction.

Further, the root portion 62a of the inward cushion member 62 is integrally bonded to the back surface 34 of the garnish main body 32, and the root portion 65a of the outward cushion member 65 is integrally bonded inside the recess groove 56 of the second edge 55.

As a hard synthetic resin for forming the garnish main body 32 serving as a main body member, there are exemplified ABS resin, PP resin, AES resin, PPO resin, PC resin, PA resin and the like. It is preferable to use a resin material such as AES resin or PP resin which is excellent in weathering resistance.

The garnish main body 32 can be also formed by die-cast molding and thixotropic molding of light alloy. Further, when the garnish main body 32 is formed of a light alloy, a die-cast molded article of aluminum alloy, zinc alloy, and magnesium alloy or a thixotropic molded article of magnesium alloy can be used. The garnish main body 32 is thin-walled, compared with a case where a molded article of hard synthetic resin is used.

In the first embodiment, the garnish main body 32 is gas-assist injection molded of a hard synthetic resin material such as ABS resin, AES resin, PP resin or the like. At the time of the gas-assist injection molding, the garnish main body 32 is molded so that the hollow portion 35 continues along the longitudinal direction.

The hollow portion 35 of the garnish main body 32 is formed by a hollow wall portion 35a surrounding the hollow portion 35. The hollow wall portion 35a is composed of a backside wall 35b composing the back surface, a surface wall 35d opposing the backside wall 35b, and a pair of side walls 35c1 and 35c2 connecting the backside wall 35b and the surface wall 35d. Further, the projecting portion 36 projecting from the back surface 34 of the garnish main body 32 integrally projects from the backside wall 35b and/or the side wall 35c2 of the hollow wall portion 35a.

The root portion 37 of the projecting portion 36, which continuously or intermittently projects along the longitudinal direction from the back surface of the garnish main body 32, has a transverse cross-section, which is bent in the direction where the substantially V-shaped or U-shaped recess groove 56 is molded between the second edge 55 and the root portion 37, and extends along the longitudinal direction of the garnish main body 32. When the outward cushion member 65 is injection-molded, the elastic polymer material of the outward cushion member 65 fill at least a portion of the recess groove 56 and form a bonding and fixing portion of the root portion 65a of the outward cushion member 65 (refer to FIG. 7).

As shown in FIGS. 3 to 7, the projecting portion 36 of the garnish main body 32 excluding the root portion 37 is intermittently formed in the longitudinal direction, and clip mounting portions 40 and first to third plate-shaped reinforcing ribs 43, 44, and 46 are formed in a plurality of upper, lower, and middle places of the longitudinal direction.

In the first embodiment, the clip mounting portion 40, the third reinforcing rib 46, the second reinforcing rib 44, the first reinforcing rib 43, and the clip mounting portion 40 are respectively formed from the upward distal portion toward the downward distal portion in the longitudinal direction of the root portion 37 of the projecting portion 36 of the garnish main body 32, as shown in FIG. 3.

In the plurality of clip mounting portions 40 of the garnish main body 32, a square-hole-shaped engaging portion 41 is formed to have an engaging tip 42 formed on the hole edge thereof, as shown in FIGS. 3 and 4. The engaging tip 42 can be engaged with a mounting clip 20 which is previously mounted on the side flange 4 of the window opening edge 3.

The mounting clip 20 composed of an elastic material such as a spring steel plate is formed to have a substantially U-shaped cross-section, the mounting clip 20 having an insertion groove into which the clip mounting portion 40 is inserted. In one side plate portion 20a, which is positioned in the front windowpane 6 side, between both side plate portions of the mounting clip 20, an engaging portion 24 is formed to be engaged with the engaging tip 42 of the clip mounting portion 40 so as to prevent slippage. Further, the side plate portion 20b of the mounting clip 20 in the window opening edge 3 is previously bonded and fixed to the side flange 4 of the window opening edge 3 by a double-faced adhesive tape 19 or the like.

As shown in FIGS. 6 and 7, in the plurality of (or one) second reinforcing ribs 44 serving as a reinforcing rib of the garnish main body 32, the avoiding rib 45 is formed in a portion of the longitudinal direction so as to be offset inward (the inward direction shown in FIG. 4) from the longitudinal direction of the second reinforcing rib 44, and the side surface of the avoiding rib 45 is used as one side wall of the injection route 85 of the injection mold 70 to be described below. In FIG. 6, reference 66a represents an injecting portion, and the injecting portion 66a is formed of elastic polymer material which is filled in an injection route 85 to be described below.

In the root portion of the avoiding rib 45, a through hole 45a for forming a connecting portion 66 is formed to pass through the avoiding rib 45, the connecting portion 66 connecting the inward cushion member 62 and the outward cushion member 65 in the transverse cross-sectional direction.

In other words, the through hole 45a is provided so that a connecting flow path 130 is formed to pass through the avoiding rib 45, the connecting flow path 130 connecting respective molding cavities 120 and 125 to be described below.

Figure 11:
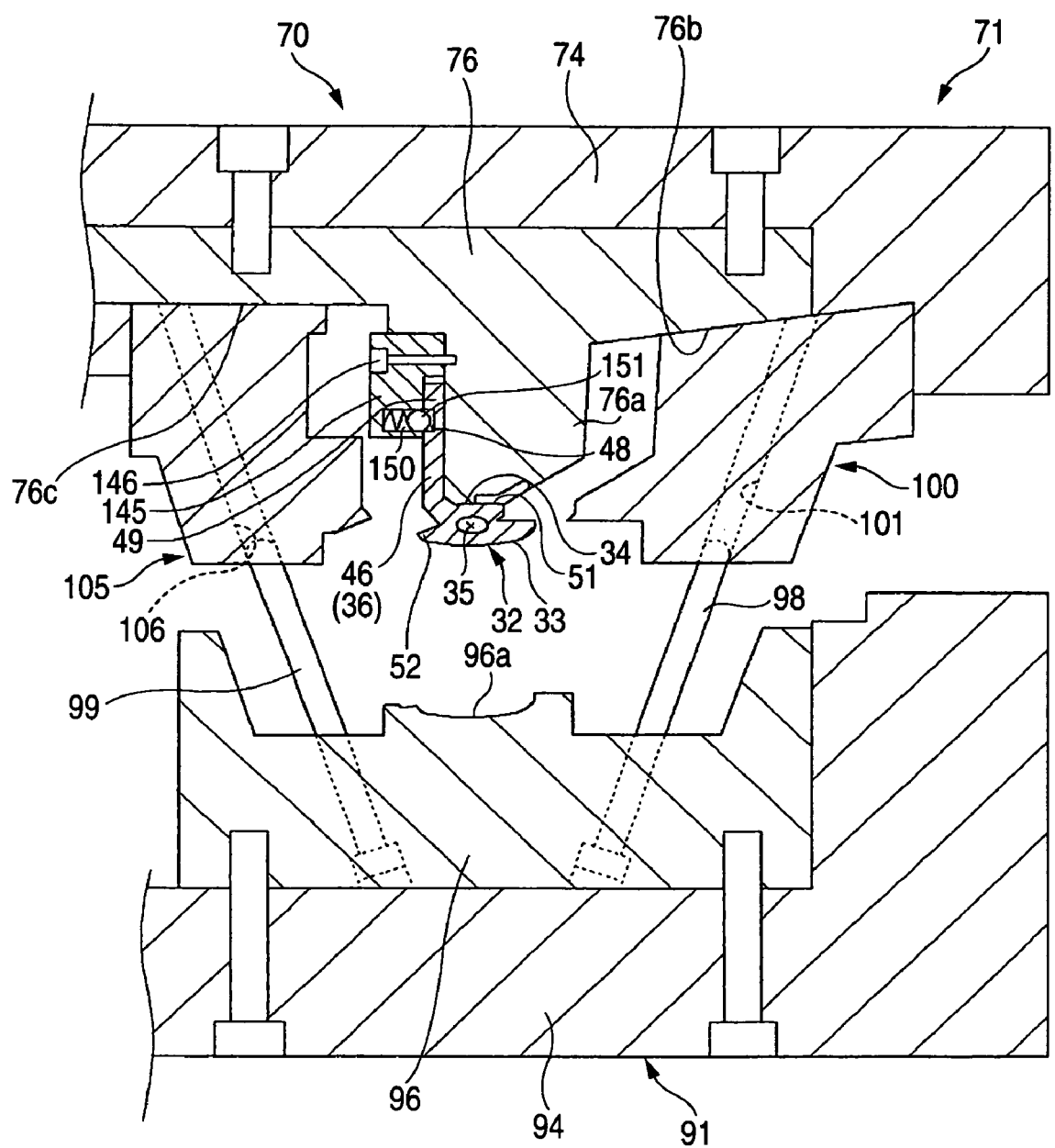
FIG. 11 is a cross-sectional view showing a state where one half portion of the injection mold is enlarged and the injection mold is opened to set a garnish main body.
Figure 12:
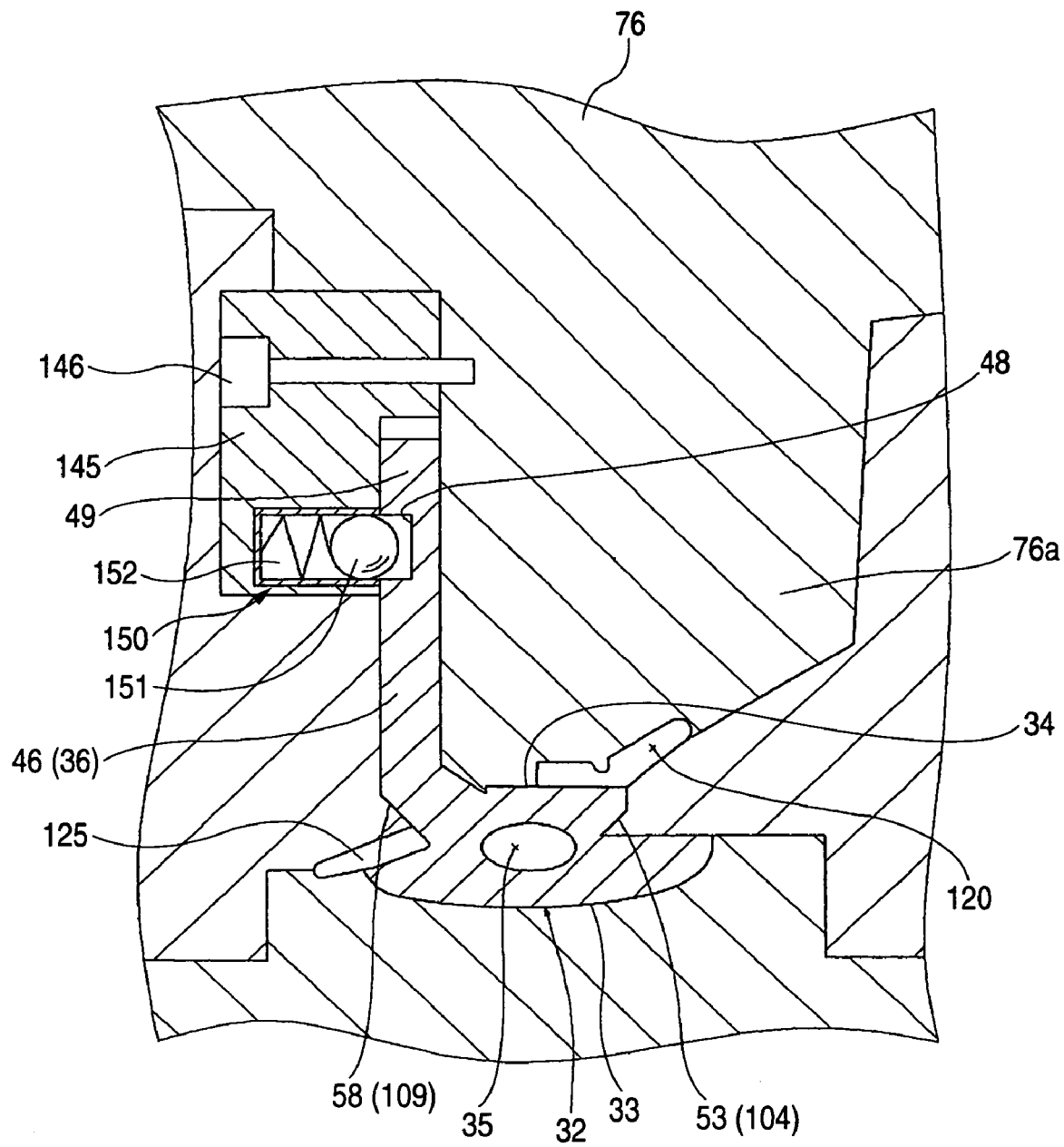
FIG. 12 is a cross-sectional view showing a state where the injection mold is closed.

In the top end of the plurality of (or one) third reinforcing ribs 46 serving as the projecting portion 36 of the garnish main body 32, an engaging piece 49 integrally extends, as shown in FIGS. 11 and 12. In the engaging piece 49, an engaging portion 48 composed of a hole or concave portion is formed to be engaged and released with and from the ball 151 of a ball plunger 150 serving as a holding unit at the time of molding. Moreover, the engaging piece 49 may be removed by cutting after the cushion members such as the inward cushion member 62 and the outward cushion member 65 are molded.

The inward cushion member 62 comes in elastic contact with the outside surface 6a of the front windowpane 6 as a mounting body, in a state where the pillar garnish 31 as the above-described composite molded article is mounted on an automotive body, as shown in FIGS. 1 and 4. Further, the outward cushion member 65 comes in elastic contact with the automotive body panel as a mounting body, that is, the top portion of the side flange 4 of the window opening edge 3 or the outside surface of the front panel 2 continuing to the top portion.

As such, the garnish main body 32 made of a hard material is prevented from coming in direct contact with the front pillar (automotive panel) 2 and the front windowpane 6 by the inward cushion member 62 and the outward cushion member 65 to thereby prevent the front pillar 2 and the front windowpane 6 from being damaged. Further, abnormal noise due to vibration while a vehicle is moving is prevented from occurring by the inward cushion member 62 and the outward cushion member 65.

When a vehicle is moving, rain water flowing toward the left and right portions of the outside surface of the front windowpane 6 is interrupted in the concave portion constructed between the back surface of the garnish main body 32 and the inward cushion member 62. Then, the rain water is guided by the concave portion so as to flow down, or flow towards the upward roof panel 1. Therefore, it is prevented that the rain water runs over (across) the pillar garnish 3 so as to flow toward the side windowpane (side glass) of the vehicle. Further, the range of side view of a passenger is not deteriorated.

Next, a method of manufacturing a pillar garnish as the above-described composite molded article and a device of manufacturing the composite molded article, which is used in the method, will be described with reference to FIGS. 8 to 14.

Figure 8:
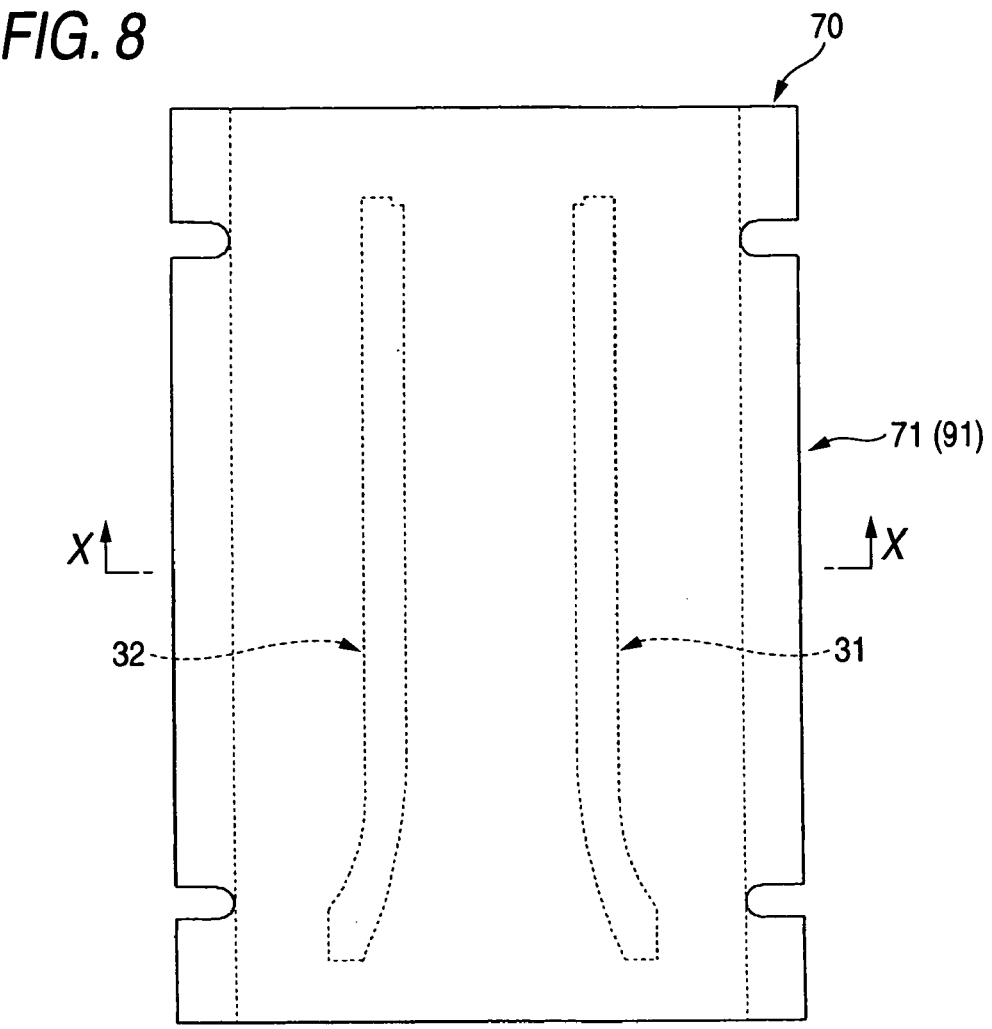
FIG. 8 is a plan view illustrating an injection mold for manufacturing the pillar garnish as a composite molded article according to the first embodiment of the invention, seen from the cavity mold side.
Figure 9:
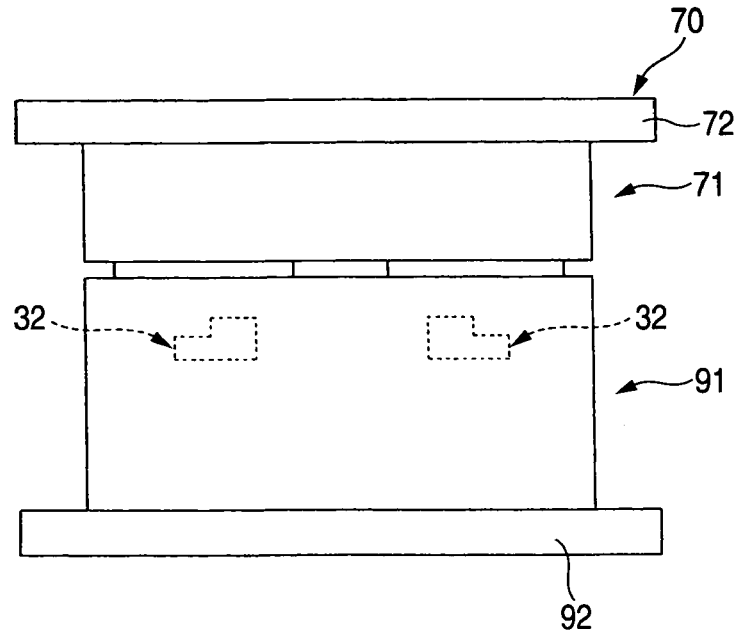
FIG. 9 is a side view illustrating the injection mold.
Figure 10:
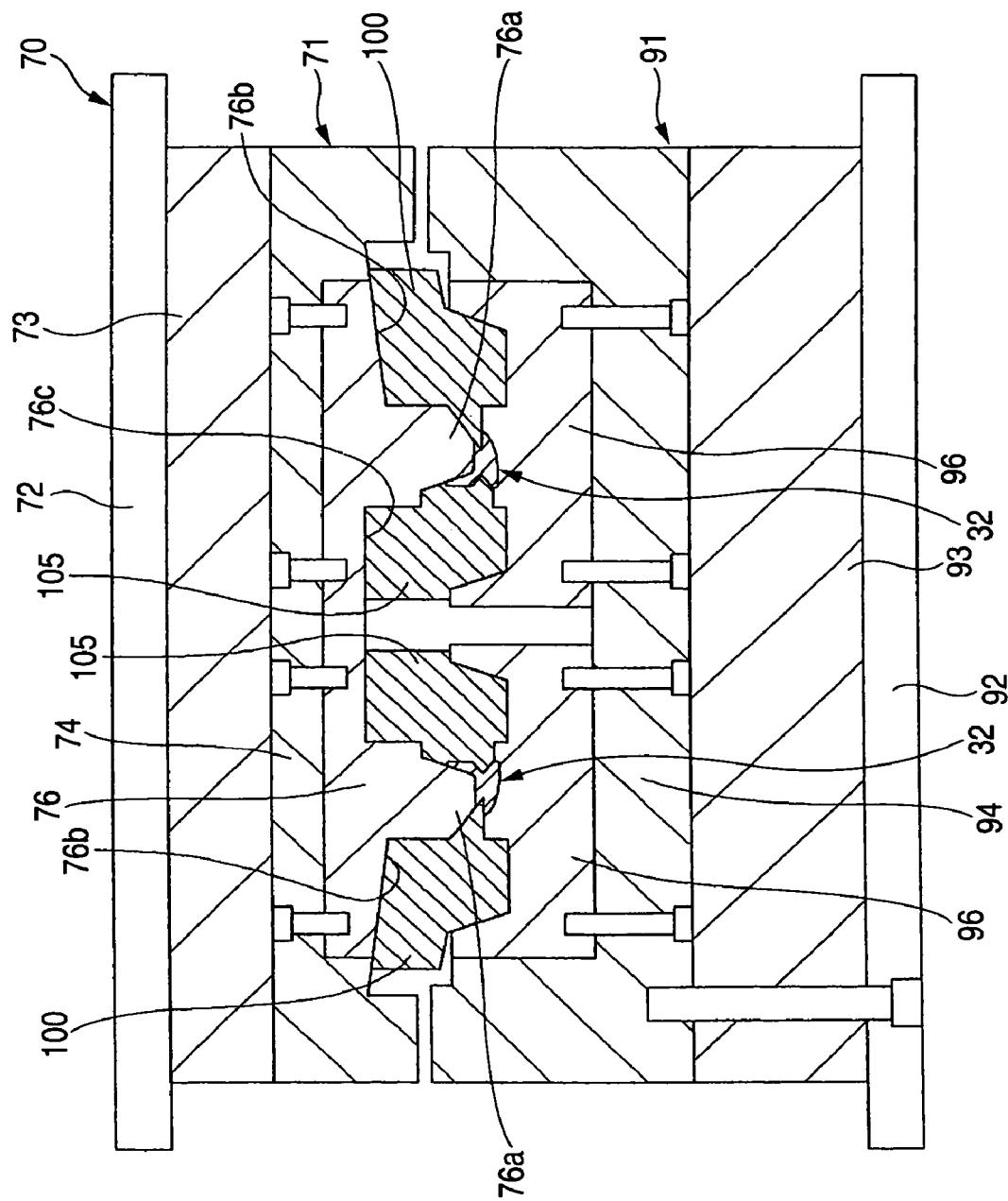
FIG. 10 is a cross-sectional view illustrating the injection mold, taken along the X-X line of FIG. 8.
Figure 13:
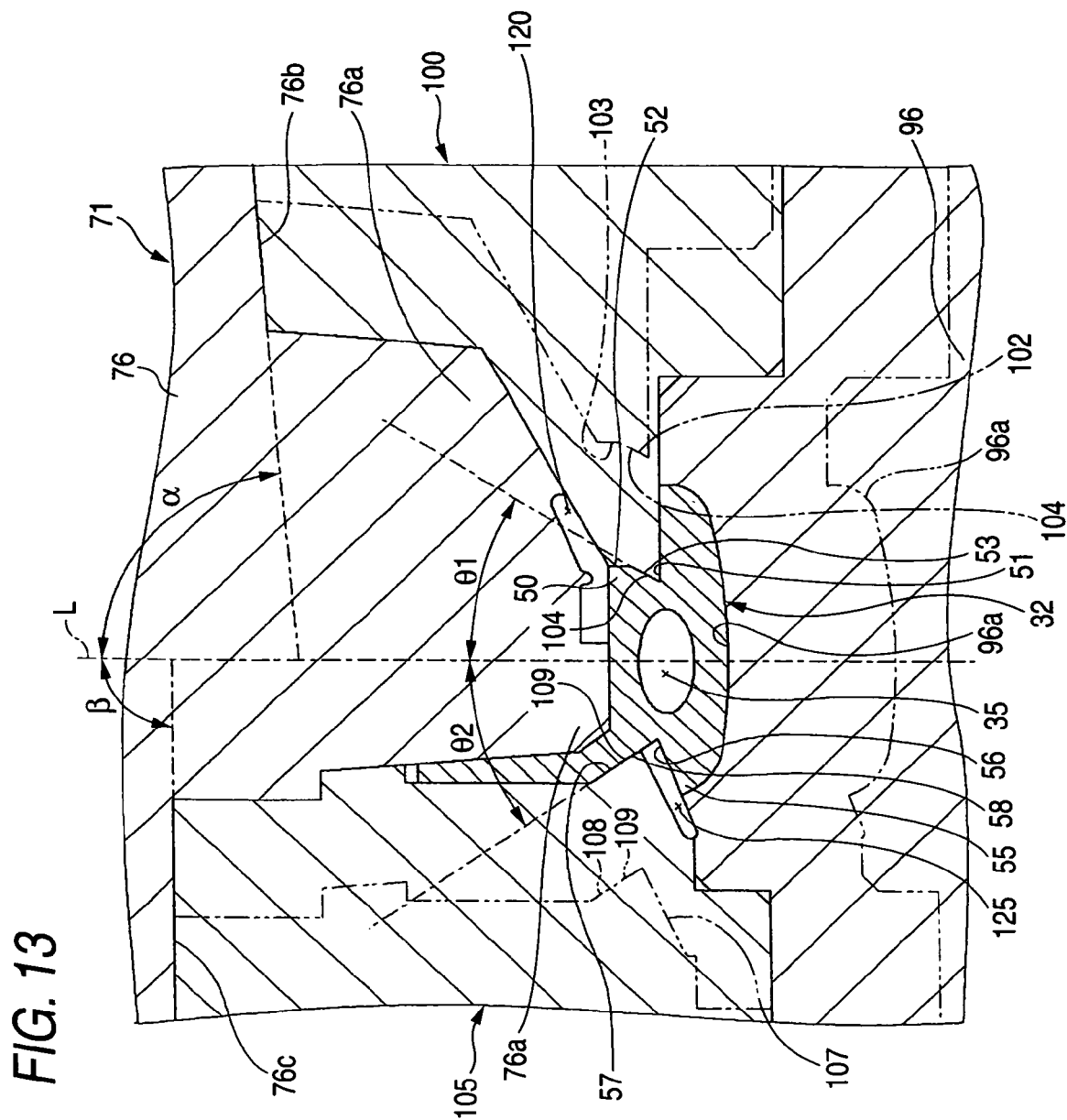
FIG. 13 is an enlarged cross-sectional view taken along the position corresponding to the V-V line of FIG. 3, showing a state where the injection mold is closed and the molding cavities are constructed.
Figure 14:
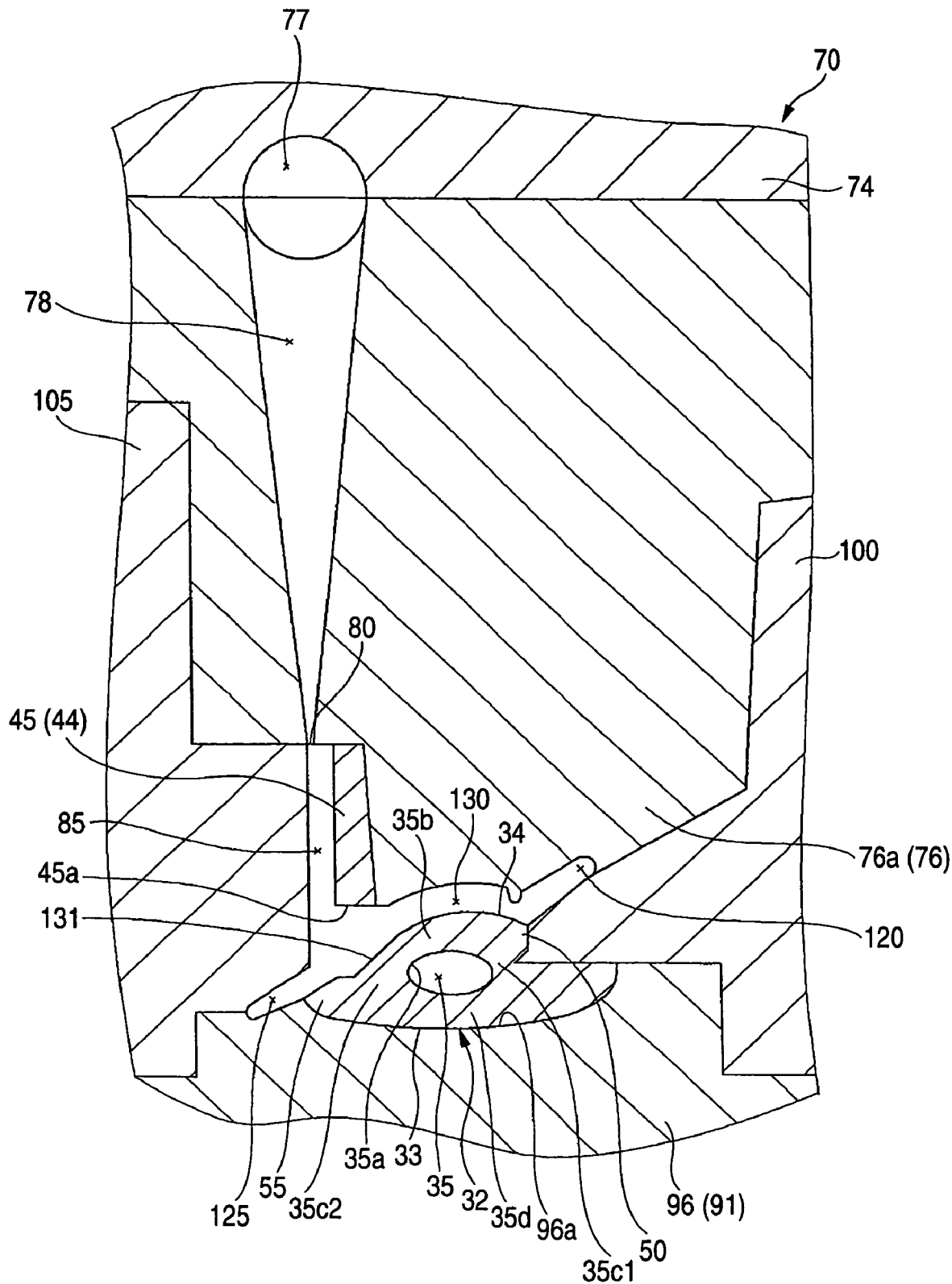
FIG. 14 is an enlarged cross-sectional view illustrating the injection mold, taken along the position corresponding to the VI-VI line of FIG. 3.

FIG. 8 is a plan view illustrating an injection mold for molding a cushion member in the garnish main body 32, seen from the core mold side. FIG. 9 is a side view illustrating the injection mold. FIG. 10 is a cross-sectional view illustrating the injection mold, taken along the X-X line of FIG. 8. FIG. 11 is a cross-sectional view of the position corresponding to the engaging piece 49, showing a state where one half portion of the injection mold is enlarged and the injection mold is opened so that the garnish main body is set. FIG. 12 is a cross-sectional view showing a state where the injection mold is closed. FIG. 13 is an enlarged cross-sectional view taken along the V-V line of FIG. 3, showing a state where the injection mold is closed so that the molding cavity is constructed. FIG. 14 is an enlarged cross-sectional view illustrating the injection mold, taken along the VI-VI line of FIG. 3.

As shown in FIGS. 8 to 11, the device for manufacturing the pillar garnish as a composite molded article is composed of an injection mold 70 having a core mold 71 and a cavity mold 91 which is openable and closable. The core mold 71 includes a fixing plate 72 which is mounted on a predetermined fixing portion (not shown), a runner stopper plate 73 provided in one surface of the fixing plate 72, a mold plate 74 fixed to one side surface of the runner stopper plate 73, and a main mold portion (middle mold) 76 fixed to one side surface of the mold plate 74.

In the main mold portion 76 of the core mold 71, set portions 76a and 76a, in which the left and right garnish main bodies 32 can be symmetrically set, are respectively formed in a projection shape, as shown in FIG. 10.

In the root portion of one wall surface of the set portion 76a, a ball plunger fixing mold 145 for mounting the ball plunger 150 as a holding unit is fixed by a bolt 146, as shown in FIGS. 11 and 12.

Between the core mold of the ball plunger 145 and one wall surface of the set portion 76a, a gap is formed into which the engaging piece 49 formed in the front end of the third reinforcing rib 46 of the garnish main body 32 can be inserted. Further, in the core mold of the ball plunger 145, the ball 151 and the ball plunger 150 are mounted in the longitudinal direction of the main body 32 so as to be spaced at predetermined intervals.

The ball 151 can be engaged and released with and from the engaging portion 48, composed of a hole or concave portion, of the engaging piece 49 of the plurality of third reinforcing ribs 46 inserted into the gap, and the ball plunger 150 has a spring 152 which pushes the ball 151 in the direction orthogonal to the insertion direction of the engaging piece 49 of the third reinforcing rib 46.

As shown in FIG. 12, the garnish main body 32 is set by the ball plunger 150 serving as a holding unit so that the garnish main body is positioned in the set portion 76a of the main mold portion 76 of the core mold 71 by the ball plunger 150 serving as a holding unit. In this state, if a line parallel to the opening and closing direction of the cavity mold 91 is set to a reference line L as shown in FIG. 13, the garnish main body 32 is set so that the edge slopes 53 and 58 of the garnish main body 32 respectively form angles $\theta 1$ and $\theta 2$ crossing each other at an acute angle with respect to the reference line L. Preferably, the crossing angles $\theta 1$ and $\theta 2$ are set to be in the range of $45°\pm25°$.

As shown in FIGS. 10 and 11, the cavity mold 91 includes a fixing plate 92 which is mounted on an opening and closing driving portion so as to be opened and closed, a holding plate 93 provided on one surface of the fixing plate 92, a mold plate 94 fixed to one surface of the holding plate 93, and a main mold portion (middle mold) 96 fixed to one surface of the mold plate 94.

In the main mold portion 96 of the cavity mold 91, a recess mold surface 96a is formed to sandwich the garnish main body 32 set in the set portion 76a in cooperation with the set portion 76a of the main mold portion 76 of the core mold 71.

In both side portions of the set portion 76a of the main mold portion 76 of the cavity mold 71, sliding surfaces 76b and 76c are formed, as shown in FIGS. 11 and 13. On the sliding surfaces 76b and 76c, a first sliding mold 100 and a second sliding mold 105 are respectively provided so as to move back and forth in the direction crossing the opening and closing direction of the cavity mold 91 in accordance with the opening and closing operation of the cavity mold 91.

In the first embodiment, the first and second sliding molds 100 and 105 are guided by angular pins 98 and 99 provided in the main mold portion 96 of the cavity mold 91 so as to move back and forth synchronously with the opening and closing operation of the cavity mold 91, as shown in FIG. 11. In the first and second sliding mold 100 and 105, pin holes 101 and 106 are formed into which the angular pins 98 and 99 are inserted.

As shown in FIG. 13, in a state where a line parallel to the opening and closing direction of the cavity mold 91 is set to the reference line L, the angle α of the sliding surface 76b with respect to the reference line L is set at about 85°, and the angle β of the sliding surface 76c is set at about 90°.

Further, the first sliding mold 100 moves back and forth in the direction crossing the opening and closing direction (reference line L direction) of the cavity mold 91 at the angle α along the sliding surface 76b, and the second sliding mold 105 moves back and forth in the direction orthogonal to the opening and closing direction (reference line L direction) of the cavity mold 91.

In the front end portion of the first sliding mold 100 in the advancing direction, a mold inclined surface 104 is formed to compose a substantially triangle-shaped longitudinal projection 102 and/or a substantially V-shaped recess groove 103, as shown in FIGS. 11 and 13. The longitudinal projection 102 and the recess groove 103 are respectively formed in an inverted shape of the recess groove 51 and/or the longitudinal projection 52 of the first edge 50 of the garnish main body 32 which is set in the set portion 76a of the main mold portion 76 of the core mold 71.

In the front end portion of the second sliding mold 105 in the advancing direction, a mold inclined surface 109 is formed to compose a substantially triangle-shaped longitudinal projection 107 and/or a substantially V-shaped recess groove 108. The longitudinal projection 107 and the recess groove 108 are respectively formed in an inverted shape of the recess groove 56 and/or the longitudinal projection 57 of the second edge 55 of the garnish main body 32 which is set in the set portion 76a of the main mold portion 76 of the core mold 71.

When the first and second sliding molds 100 and 105 respectively moves, the respective longitudinal projections 102 and 107 and/or recess grooves 103 and 108 of the first and second sliding molds 100 and 105 can be respectively fitted into the recess grooves 51 and 56 and/or longitudinal projections 52 and 57 of the garnish main body 32, and the mold inclined surfaces 104 and 109 respectively come in sliding contact with the edge slopes 53 and 58 of the garnish main body 32.

It is preferable that the mold inclined surfaces 104 and 109 composing the respective longitudinal projections 102 and 107 and/or recess grooves 103 and 108 of the first and second sliding molds 100 and 105 are formed with a flat surface. Further, it is most preferable that the mold inclined surfaces 104 and 109 are formed with a flat and smooth surface.

As shown in FIG. 13, the elongated molding cavities 120 and 125 are formed, extending in the longitudinal direction along the first and second edges 50 and 55 on the respective back surfaces of the first and second edges 50 and 55 of the set garnish main body 32 and the respective mold surfaces of the injection mold 70, when the injection mold 70 is closed, that is, when the first and second sliding molds 100 and 105 move synchronously while the cavity mold 91 is closed. The molding cavities 120 and 125 are used in molding the inward and outward cushion members 62 and 65.

As shown in FIG. 14, a groove-shaped connecting flow path 130 is formed on the mold surface of the set portion 76a in the longitudinal direction of the molding cavities 120 and 125. The connecting flow path 130 connects the respective molding cavities 120 and 125 in the transverse cross-sectional direction on the back surface 34 of the garnish main body 32 and the mold surface (the mold surface of the set portion 76a of the main mold portion 76 in this first embodiment) of the injection mold 70.

The groove-shaped connecting flow path 130 is formed in a substantial arch shape between the respective molding cavities 120 and 125. Further, the connecting flow path 130 is provided with an inclined guide surface 131 which is inclined non-orthogonally to the injection direction of the elastic polymer material so as to cross the surface wall 35b of the hollow wall portion 35a surrounding the hollow portion 35 of the garnish main body 32. The injected elastic polymer materials are caused to flow along the inclined guide surface 131.

In the first embodiment, the back surface 34 of the garnish main body 32, in which the connecting flow path 130 connecting the respective molding cavities 120 and 125 is formed, is formed to have a substantially arch-shaped transverse cross-section such that the back surface 34 side becomes convex.

In a predetermined position of the injection mold 70, an injection gate 80 for injecting the elastic polymer material into the molding cavity 125 is provided within an area of the first edge 50 at the back surface 34 of the garnish main body 32 and in a position which does not reach the inner edge of the hollow portion 35, as shown in FIG. 14. The injection gate 80 can be provided in the side of the molding cavity 120 because of the limitation for the arrangement inside the core mold 71. Even in this case, the injection gate 80 is provided in a position where the same consideration as the above description is made.

In the first embodiment, the injection route 85 connecting the injection gate 80 and the molding cavity 125 is formed substantially parallel to the opening and closing direction of the cavity mold 91 within the range which is not beyond the second edge 55 in the back surface 34 of the garnish main body 32 and in a position which does not reach the inner edge of the hollow portion 35.

In the first embodiment, the injection route 85 has one side wall composing the side wall of the avoiding rib 45 of the second reinforcing rib 44.

In the first embodiment, the injection gate 80 is provided in a plurality of places in the longitudinal direction of the molding cavity 125. In a place corresponding to each injection gate 80, the injection route 85 molding the injection portion 66a and the connecting flow path 130 molding the connecting portion 66 are respectively provided (refer to FIG. 3).

In a state where the injection mold 70 is closed, a distal end molding cavity (not shown) molding the distal end cover portion 67 is formed between the mold surface of the injection mold 70 and one end of the garnish main body 32 in the longitudinal direction. A distal end molding cavity (not shown) molding the distal end cushion portion 68 is formed between the mold surface of the injection mold 70 and the other end of the garnish main body 32 in the longitudinal direction. Further, both of the distal end molding cavities respectively communicate with both ends of the molding cavities 120 and 125 in the longitudinal direction.

The injection gate 81 is also provided in a position corresponding to the distal end molding cavity molding the distal end cover portion 67 (refer to FIG. 3).

The injection gate 80 (81) communicates with a runner 77 through each sub sprue 78 (refer to FIG. 14). The runner 77 communicates with the injection nozzle of an injection molding machine through a main sprue (not shown).

Next, a method of manufacturing the pillar garnish 31 as a composite molded article using the injection mold 70 will be described.

First, in a state where the cavity mold 91 of the injection mold 70 is opened as shown in FIG. 11, the engaging piece 49 at the front end of the plurality of third reinforcing ribs 46 of the garnish main body 32 which is previously gas-assist injection-molded is inserted into the gap between the wall surface of the set portion 76a of the main mold portion 76 of the core mold 71 and the core mold of ball plunger 145. Then, after the ball 151 of the ball plunger 150 retreats, it is then engaged with the concave portion of the engaging portion 48 or the hold of the engaging piece 49 by the pressing force of the spring 152, as shown in FIG. 12. Accordingly, the garnish main body 32 is positioned and engaged on the set portion 76a of the main mold portion 76.

After that, the cavity mold 91 of the injection mold 70 is closed, and the first and second sliding molds 100 and 105 are caused to move synchronously with the closing operation of the cavity mold 91 by the angular pins 98 and 99, as shown in FIGS. 12 and 13.

With the first and second sliding molds 100 and 105 advancing, the mold inclined surfaces 104 and 109 come in contact with the edge slopes 53 and 58 so as to slightly slide, while the longitudinal projections 102 and 107 and/or recess grooves 103 and 108 of the first and second sliding molds 100 and 105 are fitted into the recess groove 51 and 56 and/or longitudinal projections 52 and 57 of the first and second edges 50 and 55 of the garnish main body 32. At this time, the advancing-direction force of the first and second sliding molds 100 and 105 is converted into a force of the mold-closing direction, so that the back surface 34 of the garnish main body 32 is pressed against the main mold portion 76 of the core mold 71 by a cam action.

Accordingly, in addition to the pressing force caused by both of the main mold portions 76 and 96 of the core mold 71 and the cavity mold 96, the garnish main body 32 is pressed by the first and second sliding molds 100 and 105 (specifically, pressed from four directions of the transverse cross-section thereof), which makes it possible to stably fix the garnish main body 32 inside the injection mold 70.

When the cavity mold 91 is closed and the first and second sliding molds 100 and 105 are caused to move, the hollow wall portion 35a surrounding the hollow portion 35 of the garnish main body 32 can be slightly elastically deformed so as to be fixed. Therefore, even if a slight variation is present in the outer dimension of the garnish main body 32, the variation can be absorbed by the elastic deformation of the hollow wall portion 35a. As a result, the garnish main body 32 can be stably and closely fixed to the respective mold surfaces of the injection mold 70, and an unexpected gap can be prevented from occurring between the garnish main body 32 and the respective mold surfaces of the injection mold 70.

As shown in FIGS. 13 and 14, the garnish main body 32 is positioned and held in the main mold portion 76 of the core mold 71, the cavity mold 91 is closed, and the garnish main body 32 is fixed inside the injection mold 70. Then, the garnish main body 32 is heated and melted, and elastic polymer material which is soluble with material of the garnish main body 32 are injected from an injection nozzle (not shown). Further, the elastic polymer material is injected from the respective injection gate 80 via the runner 77 and the respective sub sprues 78 so as to flow in the molding cavity 125 through the injection route 85. At this time, the flow pressure of the elastic polymer material flowing into the molding cavity 125 through the injection route 85 presses the edge 55 of the garnish main body 32 to be in close contact with the recess mold surface 96a of the cavity mold 91.

As shown in FIG. 14, the elastic polymer material flowing from the plurality of injection gates 80 first flows into the molding cavity 125 through the injection route 85, and some of the elastic polymer material flows into the molding cavity 120 through the connecting flow path 130 so as to be filled therein.

The elastic polymer material which is injected from other injection gates 80 at the same time as above, also flows into the respective molding cavities 120 and 125 so as to be filled therein, while flowing into the distal end molding cavity for molding the distal end cover portion 67 so as to be filled therein.

Preferably, the arranged position and shape of the injection gates 81 are suitably set so that the filling balance of all the molding cavities is kept constant.

The elastic polymer material flowing from the injection gate 80 in the vicinity of the upward distal end portion 32b of the garnish main body 32 are also filled in the distal end cavity for molding the distal end cushion member 68 via the respective molding cavities 120 and 125.

As described above, the elastic polymer material is fully filled in the respective molding cavities 120 and 125, the distal end molding cavity, and the respective connecting flow paths 130.

Accordingly, the inward and outward cushion members 62 and 65 are directly injection-molded in the first and second edges 50 and 55 of the garnish main body 32, respectively, and the distal end cover portion 67 and the distal end cushion member 68 are directly injection-molded in both ends of the garnish main body 32. Further, the inward and outward cushion members 62 and 65, the distal end cover portion 67, and the distal end cushion member 68 are integrally bonded along the first and second edges 50 and 55 and both ends of the garnish main body 32 by the heat and/or pressure of the injection-molded elastic polymer material, thereby manufacturing the pillar garnish 31 as a composite molded article.

In the first embodiment, the elastic polymer material, which is soluble with the materials of the garnish main body 32, are used to fusion-bond the inward and outward cushion members 62 and 65 to the first and second edges 50 and 55 of the garnish main body 32 so that they are integrally bonded to each other.

After that, the pillar garnish 31 is pulled out from the mold in a state where the first and second sliding molds 100 and 105 are caused to retreat to the original retreat position in synchronization with the cavity mold 91 opened up to the original position.

After the inward and outward cushion members 62 and 65 and the like are molded, an unnecessary portion such as the engaging portion 49 of the garnish main body 32 is removed, if necessary. Further, the pillar garnish 31 is completely manufactured through a suitable post-process (for example, mounting a separate member for fixing the pillar garnish on an automotive body).

In the first embodiment as described above, when the elastic polymer material, which is injected from the injection gate 80 so as to pass through the injection route 85, are caused to flow in the molding cavity 125, the flow pressure (injection pressure) of the elastic polymer material presses the second edge 55 of the garnish main body 32 from the back surface 34 side to the mold surface 96a of the main mold portion 96 of the cavity mold 91. Therefore, the surface 33 of the garnish main body 32 is closely-attached to the mold surface of the main mold portion 96 so that a gap does not be form therebetween, and a variation does not occur. The injection pressure of the elastic polymer material does not act directly in the direction where the hollow wall portion 35a of the garnish main body 32 is crushed.

As a result, the elastic polymer material is prevented from protruding in the boundary between the garnish main body 32 and the inward and outward cushion members 62 and 65, which makes it possible to prevent a flash from occurring. Further, the hollow wall portion 35a of the garnish main body 32 can be prevented from being deformed or crushed by the injection pressure of the elastic polymer material.

In the first embodiment, the garnish main body 32 can be molded to have an accurate outer shape and dimension by using a molded article in which the garnish main body 32 is molded of a hard synthetic resin material by gas-assist injection molding.

Therefore, when the inward and outward cushion members 62 and 65 are formed, an unexpected gap can be prevented from forming between the garnish main body 32 and the mold surface of the injection mold 70.

As a result, when the inward and outward cushion members 62 and 65 are molded, the desired molding cavities 120 and 125 can be formed in the garnish main body 32 and the mold surface of the injection mold 70, and the inward and outward cushion members 62 and 65 can be prevented from being defectively molded.

In the first embodiment, the projecting portion 36 projecting from the back surface 34 of the garnish main body 32 integrally projects from the backside wall 35b and/or side wall 35c of the hollow wall portion 35a surrounding the hollow portion 35 of the garnish main body 32. Therefore, on the surface of the surface 33 side of the garnish main body 32, that is, the surface wall 35d of the hollow wall portion 35a, a surface sink (also referred to as a sink mark) can be prevented from occurring.

In the first embodiment, the elastic polymer material flowing in the connecting flow path 130 can be caused to flow toward the molding cavity 120 along the inclined guide surface 131 of the backside wall 35b of the hollow wall portion 35a of the garnish main body 32. Therefore, the flow pressure generated when the elastic polymer material flows can be prevented from acting in the direction orthogonal to the backside wall 35b or side wall 35c2 of the hollow wall portion 35a, and the hollow wall portion 35a of the garnish main body 32 can be favorably prevented from being deformed or damaged.

In the first embodiment, the connecting flow path 130 is formed in a substantial arch shape so as to connect the respective molding cavities 120 and 125 across the back surface of the hollow wall portion 35a of the garnish main body 32.

In other words, in a portion forming the connecting flow path 130, the pressure when the elastic polymer material flows or when the pressure thereof is converted into an internal compression force along the substantial arch shape by the back surface 34 of the garnish main body 32 which is formed in a substantial arch shape so that the back surface 34 becomes convex.

Therefore, when the elastic polymer material flows in the connecting flow path 130 or when the pressure thereof is constant, the hollow wall portion 35a of the garnish main body 32 can be prevented from being deformed or damaged by the pressure of the elastic polymer material.

In the first embodiment, as shown in FIG. 5, the root portion 37 of the projecting portion 36, which projects from the back surface 34 side of the garnish main body 32, has a transverse cross-sectional shape which is bent in a direction where the recess groove 56 having a substantially V-shaped or U-shaped transverse cross-section is formed between the second edge 55 of the garnish main body 32 and the root portion 37 of the projecting portion 36. Further, the root portion 37 of the projecting portion 36 extends along the longitudinal direction of the garnish main body 32. When the outward cushion member 65 is injection-molded, the elastic polymer material of the outward cushion member 65 fills at least a portion of the recess groove 56 and forms the bonding and fixing portion of the outward cushion member 65.

As such, the garnish main body 32 and the outward cushion member 65 are bonded and fixed with the recess groove 56 serving as the bonding and fixing portion. Then, the contact area of the outward cushion member 65 with respect to the second edge 55 of the garnish main body 32 can be enlarged to enhance a bonding and fixing force, and the outward cushion member 65 can be prevented from being removed when the pillar garnish 31 is carried or used.

In the first embodiment as shown in FIGS. 3 to 5, the projecting portion 36 projecting from the back surface 34 side of the garnish main body 32 forms the first to third reinforcing ribs 43, 44, and 46 continuously or intermittently extending in the longitudinal direction in a portion excluding a portion where the clip mounting portion 40 is formed. Further, the torsional rigidity or front/back-direction bending strength of the garnish main body 32 can be enhanced by the first and third reinforcing ribs 43, 44, and 46, and thus it is possible to stably mount the pillar garnish 31 in a predetermined posture onto an automotive body.

In the first embodiment as shown in FIGS. 7 and 14, the avoiding rib 45 deviating from the direction where the second reinforcing rib 44 extends is formed in a portion of the second rib 44 in the longitudinal direction, and the injection route 85 is provided in the avoiding rib 45 so as to inject elastic polymer material. Therefore, the strength of the garnish main body 32 is not reduced, compared with a case where a portion of the second reinforcing rib 44 is removed and the injection route 85 is provided as in a fourth embodiment to be described below.

In the first embodiment, the loss in injection pressure when the elastic polymer material flows in the respective elongated molding cavities 120 and 125 is suppressed by the injection gate 80, the injection route 85, and the connecting flow path 130 provided in a plurality of places in the longitudinal direction, so that the necessary and sufficient elastic polymer materials can be injected and filled in the respective molding cavities 120 and 125. Therefore, the elongated inward and outward cushion members 62 and 65 can be prevented from being defectively molded.

In the first embodiment, the holding unit, provided in the main mold portion 76 of the core mold 71 in which the garnish main body 32 is set, is engaged with the engaging portion 48 of the third reinforcing rib 46 of the garnish main body 32, and can hold the garnish main body 32 in a predetermined state where the garnish main body 32 is set to be positioned in the set portion of the main mold portion 76 by the engagement force thereof. Therefore, even when a transverse injection molding machine which is opened and closed in the transverse direction is used, the garnish main body 32 can be prevented from positionally deviating or dropping at the time of opening and closing the injection mold 70, and it is possible to effectively manufacture the pillar garnish 31.

In the first embodiment, the holding units are provided in a plurality of places so as to be spaced in a predetermined distance in the longitudinal direction of the garnish main body 32. Therefore, the garnish main body 32 can be more favorably prevented from positionally deviating or dropping.

With the holding unit being composed of the ball plunger 150, the garnish main body 32 can be easily and reliably held in the engaging portion 48 of the third reinforcing rib 46, without using a complicated mold structure.

In the engaging portion 48, if a portion through which the ball 151 of the ball plunger 150 passes is formed to have an inclination, the insertion of the garnish main body 32 and the removal thereof after molding are more easily carried out.

In the first embodiment, the first and second sliding molds 100 and 105 are caused to moves back and forth synchronously with the opening and closing operation of the cavity mold 91 by the angular pins 98 and 99 provided in the cavity mold 91, as shown in FIG. 11. Therefore, driving devices (using an electrically-operated motor or cylinder as a driving source) dedicated to the sliding molds are not needed, and the manufacturing of the injection mold 70 can be simplified. Further, the structure of the injection mold 70 can be simplified so as to be provided at a low price.

However, if necessary, the movement of the first and second sliding molds 100 and 105 can be controlled by using a driving device dedicated to the sliding mold. In this case, the first and second sliding molds 100 and 105 can be controlled one by one without being limited to the opening and closing operation of the cavity mold 91, or the movement thereof can be controlled by changing the speed thereof. Accordingly, the degree of freedom of movement of the first and second sliding molds 100 and 105 increases.

Second Embodiment

Next, a second embodiment of the present invention will be described with reference to FIGS. 15 and 16.

Figure 15:
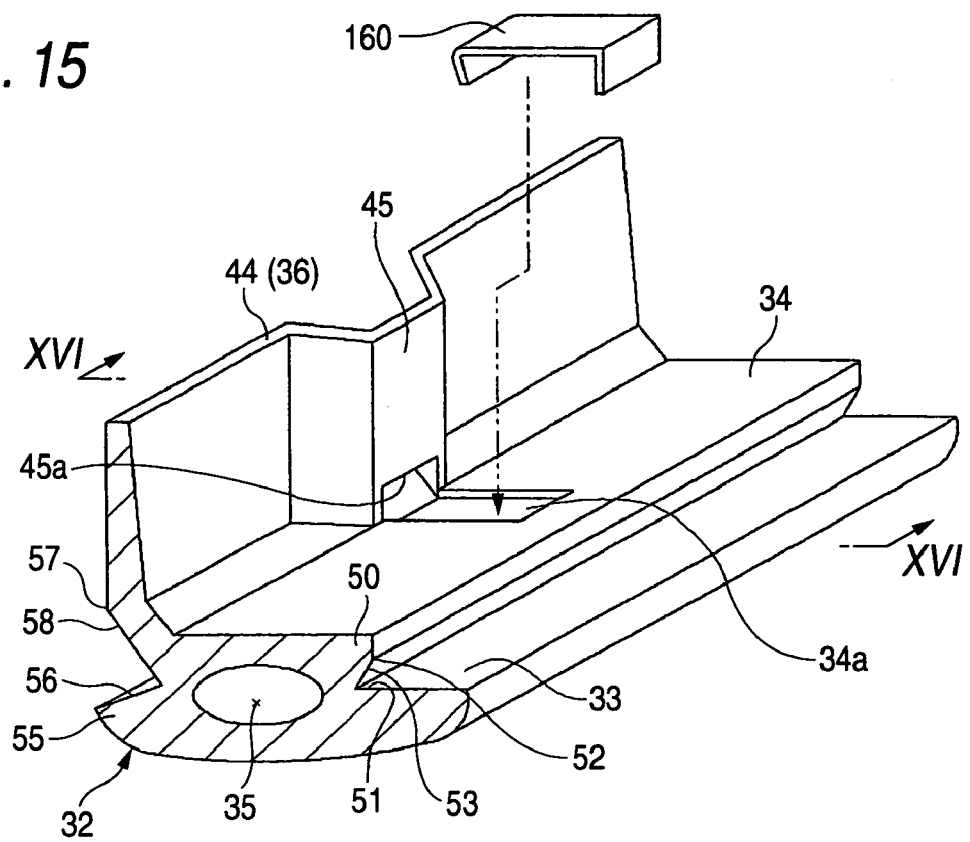
FIG. 15 is a partial perspective view showing a second embodiment of the invention and showing a process in which a separate reinforcement is disposed in a portion corresponding to the connecting flow path of the back surface of the garnish main body.

FIG. 15 is a partial perspective view showing a process in which a separate reinforcement is disposed in a portion corresponding to the connecting flow path of the back surface 34 of the garnish main body. FIG. 16 is a transverse cross-sectional view taken along XVI-XVI line of FIG. 15, showing a state where a separate reinforcement is disposed on the back surface of the garnish main body so as to be set in the injection mold and the injection mold is closed.

Figure 16:
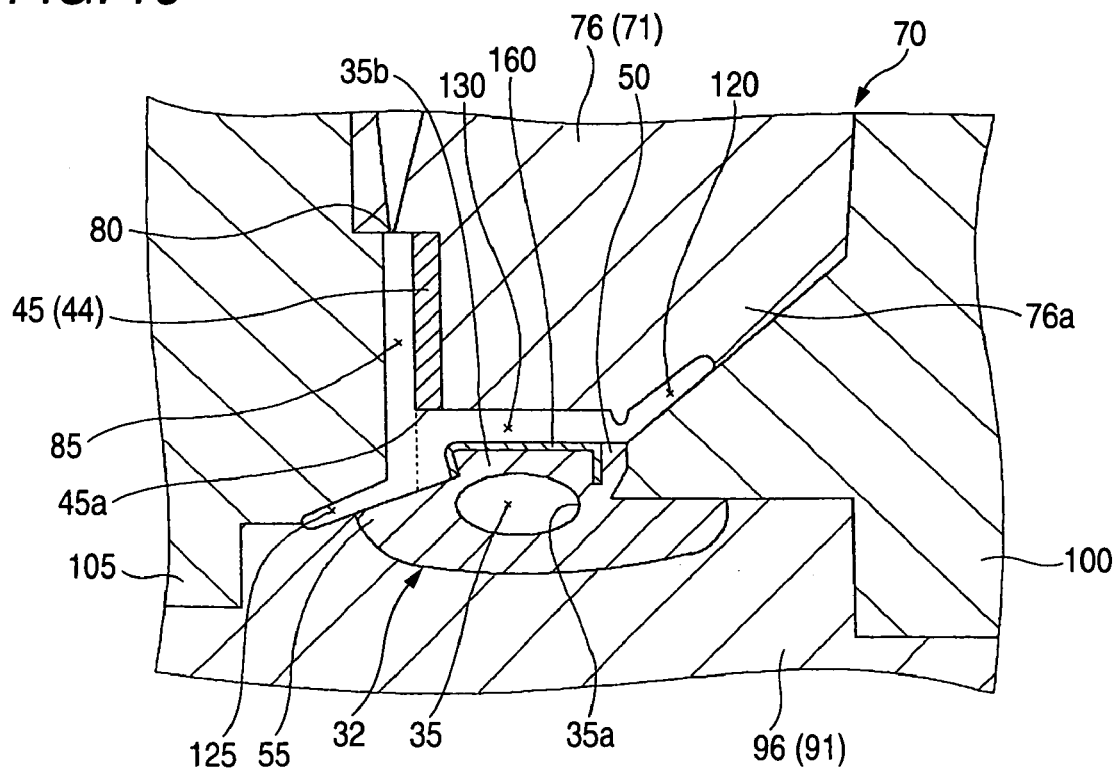
FIG. 16 is a cross-sectional view taken along the XVI-XVI line of FIG. 15, showing a state where a separate reinforcement is disposed in the back surface of the garnish main body so as to be set in the injection mold and the injection mold is closed.

In the second embodiment as shown in FIGS. 15 and 16, before closing the injection mold 70, a recess portion 34a is provided in a portion corresponding to the connecting flow path 130 of the back surface 34 of the garnish main body 32, and a separate reinforcement 160 having a substantially U-shaped cross-section is disposed to be fitted into the recess portion 34a so that the back surface of the garnish main body 32 and the surface of the reinforcement 160 are flush.

It is preferable that the reinforcement 160 is formed of a stiff material such as metal or hard synthetic resin of which the thermal resistance is higher than a material of the garnish main body 32. Further, it is most preferable that the reinforcement 160 is formed of a metallic plate which is easily processed and of which the thermal resistance is excellent and the material cost is low.

Since the construction of the second embodiment is almost the same as the first embodiment, like reference numerals are attached to the same components, and the descriptions thereof are omitted.

In the second embodiment, the reinforcement is formed of a stiff material of which the thermal resistance is higher than a material of the garnish main body 32, so that the strength and thermal resistance of the back surface 34 side of the garnish main body 32 favorably increase. When the inward and outward cushion members 62 and 65 are injection-molded, the hollow wall portion 35a of the garnish main body 32 is effectively prevented from being deformed or crushed.

Since the reinforcement 160 is formed of a metallic plate which is easily processed and of which the thermal resistance is excellent and the material cost is low, the hollow wall portion 35a of the garnish main body 32 can be prevented from being deformed or crushed, and there is an advantage even in cost.

Third Embodiment

Next, a third embodiment of the present invention will be described with reference to FIGS. 17 and 18.

Figure 17:
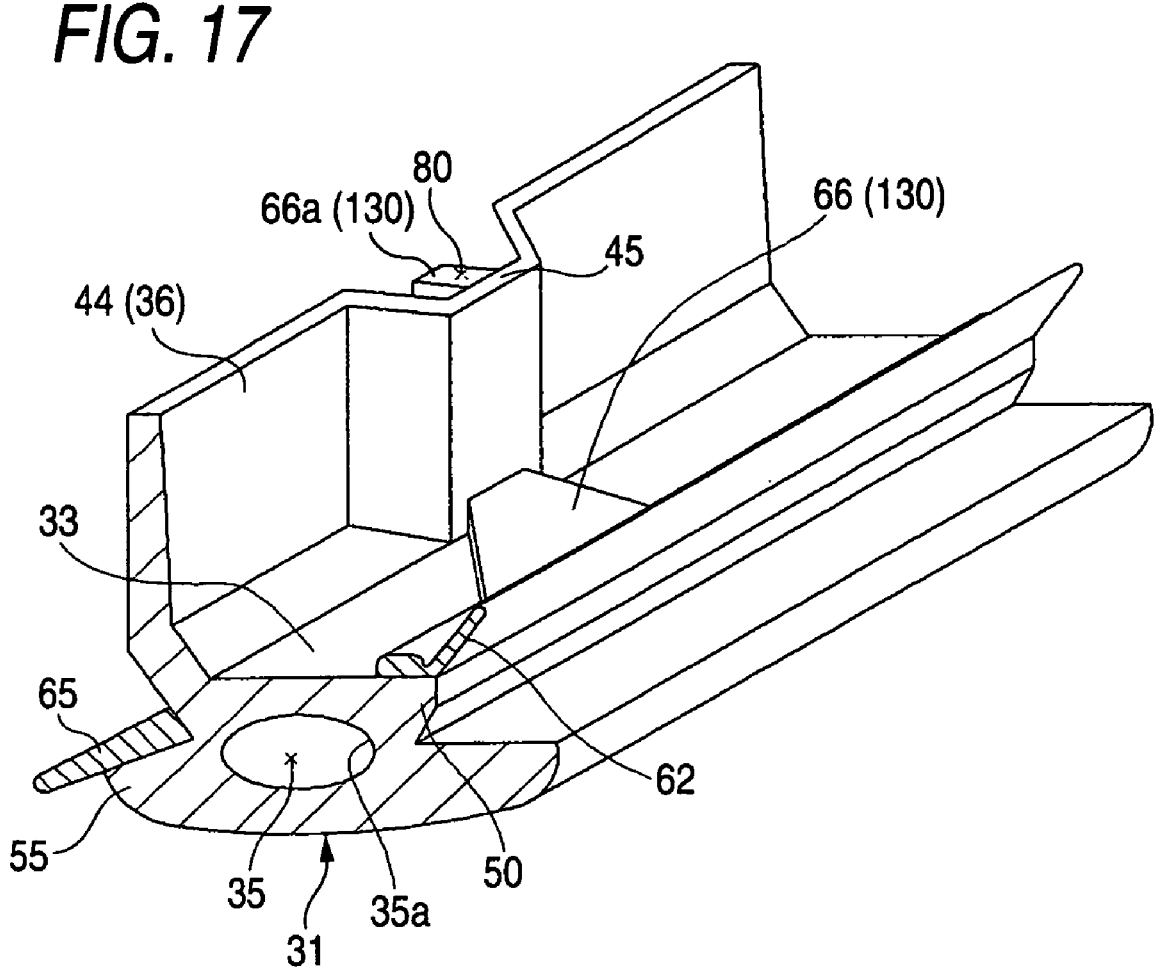
FIG. 17 is a partial perspective view showing a third embodiment of the invention and showing the connecting portion between an inward cushion member and outward cushion member of the back surface of the pillar garnish.

FIG. 17 is a partial perspective view showing a connecting portion between the inward and outward cushion members on the back surface 34 of the pillar garnish. FIG. 18 is a diagram explaining a state where the cross-sectional area of the connecting portion changes.

Figure 18:
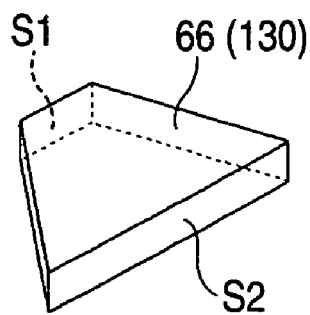
FIG. 18 is a perspective view explaining a change in the state where the cross-sectional area of the connecting portion to be formed in the connecting path which is filled.

As shown in FIGS. 17 and 18, the connecting flow path 130 for molding the connecting portion 66 is formed so that the flow path cross-sectional area S2 in the downstream side of the entrance of the elastic polymer materials is larger than the flow path cross-sectional area S1 in the upstream side thereof.

Therefore, the mold surface forming the connecting flow path 130 between the back surface 34 of the garnish main body 32 and the connecting flow path 130 is formed in a recess groove shape. In the cross-sectional area of the recess groove, the downstream cross-sectional area is increasingly larger than the upstream cross-sectional area.

Since the construction of the third embodiment is almost the same as the first embodiment, like reference numerals are attached to the same components, and the descriptions thereof will be omitted.

In the third embodiment, the flow path cross-sectional area of the entrance of the connecting flow path 130 is increasingly enlarged from the upstream side toward the downstream side, so that the flow pressure of the elastic polymer material per unit area, which acts on the hollow wall portion 35a of the garnish main body 32, can be reduced. Therefore, it is possible to manufacture the pillar garnish 31 while preventing the hollow wall portion of the garnish main body 32 from being deformed or crushed.

Fourth Embodiment

Next, a fourth embodiment of the present invention will be described with reference to FIGS. 19 and 20.

Figure 19:
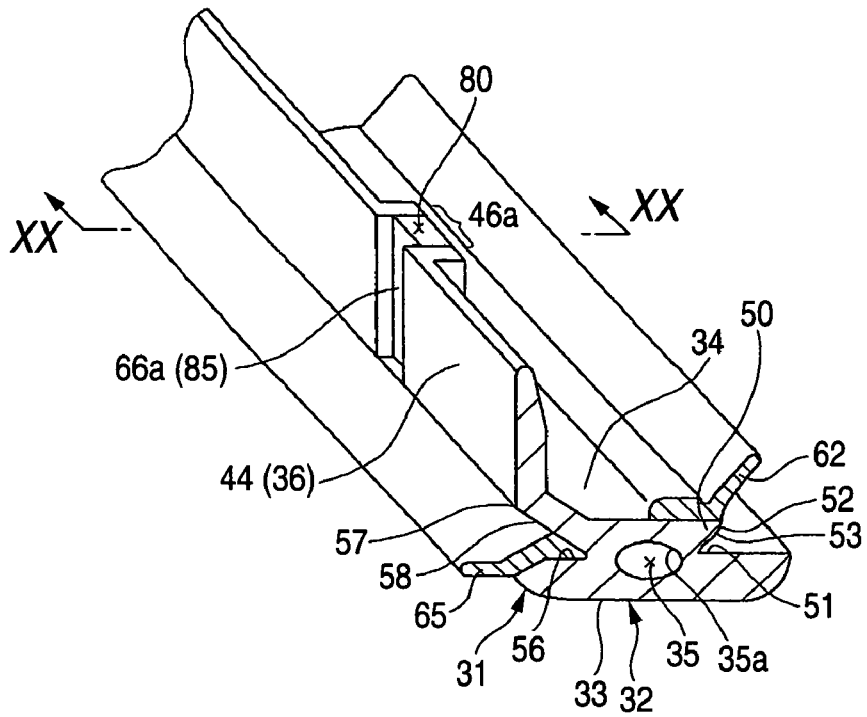
FIG. 19 is a perspective view showing a fourth embodiment of the invention and showing a state where the elastic polymer materials is filled in the injection route provided in the removed portion of the second reinforcing rib of the back surface of the garnish main body.

FIG. 19 is a partial perspective view showing a state where the elastic polymer material is filled in the injection route provided in the removed portion of the second reinforcing rib of the back surface 34 of the garnish main body. FIG. 20 is a transverse cross-sectional view taken along the XX-XX line of FIG. 19, showing a state where the garnish main body is set inside the injection mold and the injection mold is closed so that the injection route, the connecting flow path, and the molding cavities are formed.

Figure 20:
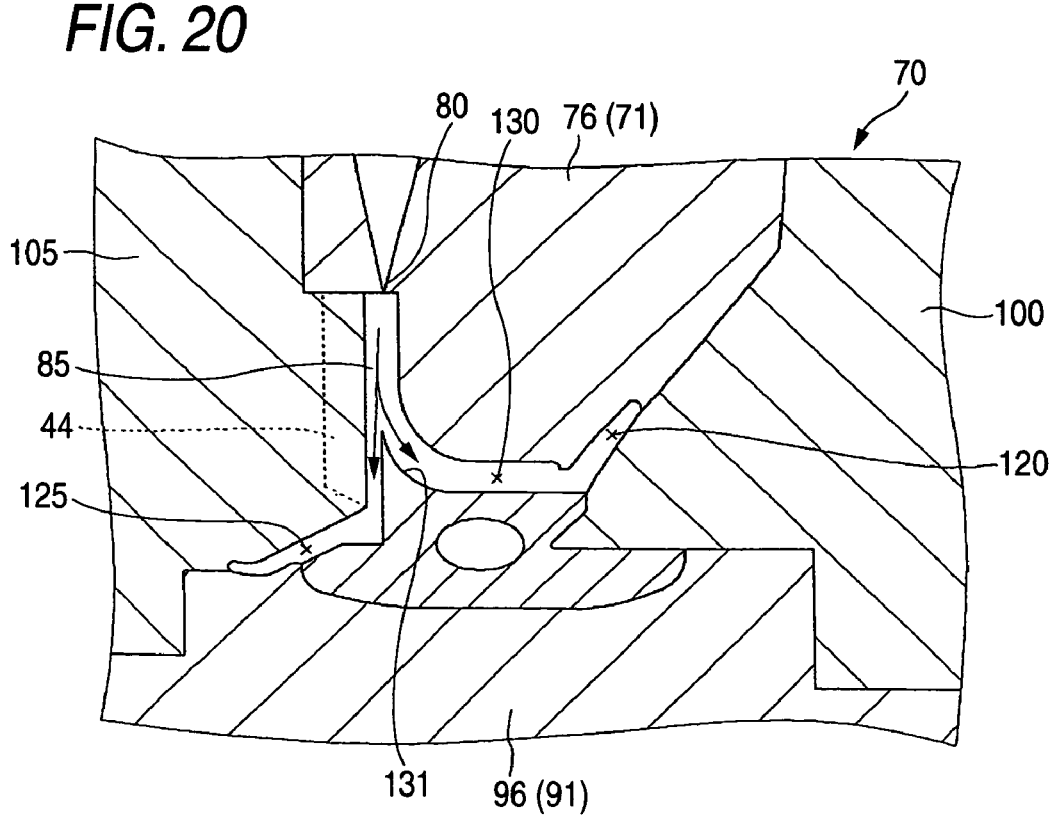
FIG. 20 is a cross-sectional view taken along the XX-XX line of FIG. 19, showing a state where the garnish main body is set inside the injection mold and the injection mold is closed so that the injection route, the connecting flow path, and the molding cavities are formed.

As shown in FIGS. 19 and 20, a portion of the second reinforcing rib 44 of the garnish main body 32 in the longitudinal direction is removed so as to form the removed portion 46a, and the injection route 85 is formed in the removed portion 46a and the mold surface when the cavity mold 91 is closed. Then, the elastic polymer material of the inward and outward cushion members 62 and 65 are injected.

The downstream portion of the injection route 85 is divided into two portions by the garnish main body 32. One of them communicates with the molding cavity 125, and the other communicates with the connecting flow path 130 through the inclined guide surface 131.

Since the construction of the fourth embodiment is almost the same as the first embodiment, like reference numerals are attached to the same components, and the descriptions thereof will be omitted.

In the fourth embodiment, the injection route 85 can be formed in the removed portion 46a of the second reinforcing rib 44 of the garnish main body 32 and the mold surface. Therefore, the through hole 45a for connecting the injection route 85 and the connecting flow path 130 does not need to be formed in the second reinforcing rib 44, and the structure of the mold for molding the garnish main body 32 can be simplified.

Although the present invention has been described on the basis of the first to fourth embodiments, the present invention is not limited to the first to fourth embodiments. It will be obvious to one skilled in the art that various modifications can be made within the spirit and scope of the invention.

For example, it has been exemplified in the first to fourth embodiments that a composite molded article is the pillar garnish 31 for window frame. However, the present invention can be adopted even when a composite molded article is a roof molding, a window-edge molding, a protector molding, a bumper or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method of manufacturing a composite molded member which is mountable onto a mounting body and integrally includes:
a front surface; a back surface; a projecting portion that intermittently projects from a back surface side; a first edge that faces a first portion of the mounting body when the composite molded member is mounted; a second edge that faces a second portion having a position which is different from that of the first portion; a long main body that is molded to have a hollow portion that is formed between the first and second edges and extending in a longitudinal direction, the hollow portion having an inner cross-sectional shape smaller than a distance between the first and second edges of the main body; and cushion members that are formed of an elastic polymer material, a hardness of which is lower than that of the main body, and are directly injection-molded on the first and second edges of the main body, the cushion members extending along the first and second edges in the longitudinal direction, the method of manufacturing the composite molded member comprising the steps of: setting the main body inside an injection mold, which is openable and closable to mold the cushion member, when the injection mold is opened; closing the injection mold so as to fix the main body inside the injection mold and to form molding cavities, which extend along the longitudinal direction between the main body and the injection mold for forming the cushion members, and a connecting flow path, which connects the molding cavities and is defined between the injection mold and the back surface of the main body; and integrally forming the cushion members on the fist-first and second edges of the main body through at least one of heat and pressure of the injected elastic polymer material, by injecting the elastic polymer material melted by heating from an injection gate through an injection route connected to the injection gate and connected to the connecting flow path, the injection route having one side wall including a side wall of the projecting portion beginning at the injection gate, into a range of at least one of the first and second edges at the back surface side of the main body of the molding cavities and into a position which does not reach the hollow portion so as to flow the elastic polymer material into one of the molding cavities, flowing the elastic polymer material into the other of the molding cavities through the connecting flow path, and filling the molding cavities with the elastic polymer material.

2. The method of manufacturing the composite molded member according to claim 1,
wherein the main body is gas-assisted injection-molded of a hard synthetic resin material to have the hollow portion extending in the longitudinal direction of the main body.

3. The method of manufacturing the composite molded member according to claim 1,
wherein the hollow portion of the main body is formed by a hollow wall portion surrounding the hollow portion, and the projecting portion projecting from the back surface side of the main body integrally projects from at least one of a backside wall and a side wall of the hollow wall portion.

4. The method of manufacturing the composite molded member according to claim 1,
wherein the connecting flow path includes an inclined guide surface which is inclined with respect to an injection direction of the elastic polymer material and intersects a wall of a hollow portion side so as to cause the injected elastic polymer material to flow along the inclined guide surface.

5. The method of manufacturing the composite molded member according to claim 1,
wherein, in a portion where the connecting flow path connecting the molding cavities across a back surface side of the hollow wall portion is formed, the back surface of the main body is formed into a substantial arch shape having a convex back surface.

6. The method of manufacturing the composite molded member according to claim 1, wherein, before closing the injection mold, a separate reinforcement is disposed in a portion corresponding to the connecting flow path on the back surface of the main body.

7. The method of manufacturing the composite molded member according to claim 6, wherein the reinforcement is formed of a rigid material which has higher thermal resistance than a material of the main body.

8. The method of manufacturing the composite molded member according to claim 7, wherein the rigid material forming the reinforcement is a metal plate.

9. The method of manufacturing the composite molded member according to claim 1, wherein, the connecting flow path has an entrance side and a downstream side of the elastic polymer material, and a flow-path cross section of the downstream side is larger than that of the entrance side.

10. The method of manufacturing the composite molded member according to claim 1, wherein, when the cushion members are formed, the elastic polymer material of the cushion member fills at least a portion of a recess groove located at least one of the first and second edges.

11. The method of manufacturing the composite molded member according to claim 1, wherein the projecting portion projecting from the back surface side of the main body is formed as a reinforcing rib which extends in the longitudinal direction in a portion other than a portion where a clip mounting portion is formed.

12. The method of manufacturing the composite molded member according to claim 11, wherein, in a portion of the reinforcing rib in the longitudinal direction, at least one of a removed portion where the reinforcing rib is removed and an avoiding rib that deviates from the longitudinal direction is formed, an injection route is provided in one of the removed portion and the avoiding rib, and the elastic polymer material of the cushion members is injected through the injection route.

13. The method of manufacturing the composite molded member according to claim 12, wherein a side surface of the avoiding rib is used as one side wall of the injection route.

14. The method of manufacturing the composite molded member according to claim 1, wherein the injection gate comprises a plurality of injection gates provided to be spaced apart from each other in the longitudinal direction, and the injection route and the connecting flow path are provided in a place corresponding to each injection gate.

15. The method of manufacturing the composite molded member according to claim 1, wherein:

the molding cavities include first and second molding cavities;

the connecting flow path connects the first and second molding cavities; and the elastic polymer material flows first into the second molding cavity at the second edge at the back surface side of the main body, and then into the first molding cavity through the connecting flow path.

16. The method of manufacturing the composite molded member according to claim 1, wherein the projecting portion is disposed at a second edge side.

* * * * *